United States Patent
Rekimoto

(10) Patent No.: US 7,930,305 B2
(45) Date of Patent: Apr. 19, 2011

(54) INFORMATION PROCESSING APPARATUS AND METHOD, AND PROGRAM

(75) Inventor: Junichi Rekimoto, Tokyo (JP)

(73) Assignee: Sony Corporation, Tokyo (JP)

( * ) Notice: Subject to any disclaimer, the term of this patent is extended or adjusted under 35 U.S.C. 154(b) by 773 days.

(21) Appl. No.: 11/042,138

(22) Filed: Jan. 26, 2005

(65) Prior Publication Data

US 2005/0195696 A1    Sep. 8, 2005

(30) Foreign Application Priority Data

Feb. 3, 2004   (JP) .................................. 2004-026794

(51) Int. Cl.
*G06F 17/30*  (2006.01)

(52) U.S. Cl. ........................................ 707/750; 707/748

(58) Field of Classification Search .................. None
See application file for complete search history.

(56) References Cited

U.S. PATENT DOCUMENTS

| | | | | |
|---|---|---|---|---|
| 6,865,600 | B1 * | 3/2005 | Brydon et al. ................ | 709/219 |
| 7,345,232 | B2 * | 3/2008 | Toivonen et al. ............. | 709/203 |
| 2002/0082901 | A1 * | 6/2002 | Dunning et al. ............... | 705/10 |
| 2002/0152267 | A1 * | 10/2002 | Lennon .......................... | 707/10 |
| 2002/0152278 | A1 * | 10/2002 | Pontenzone et al. .......... | 709/217 |

FOREIGN PATENT DOCUMENTS

| | | |
|---|---|---|
| JP | 2001-155469 | 6/2001 |
| JP | 2004-005862 | 1/2004 |
| JP | 2004-032503 | 1/2004 |

* cited by examiner

*Primary Examiner* — Debbie Le
*Assistant Examiner* — Jau-Shya Meng
(74) *Attorney, Agent, or Firm* — Oblon, Spivak, McClelland, Maier & Neustadt, L.L.P.

(57) ABSTRACT

The present invention relates to an information processing apparatus for controlling content reproduction on a basis of a first weight set to a playlist of contents and indicating a priority of the playlist and a second weight set to each of contents registered in playlists and indicating a priority of the content. The information processing apparatus includes a weight setting unit for, when a plurality of playlists are selected, updating a first weight set to each of the plurality of selected playlists and updating a second weight set to each of contents registered in the plurality of selected playlists according to one of a number of playlists in which each of the contents is registered and a specified reproduction method, and a reproduction controlling unit for controlling random content reproduction on a basis of the first weight and the second weight set by the weight setting unit.

9 Claims, 18 Drawing Sheets

F I G. 3
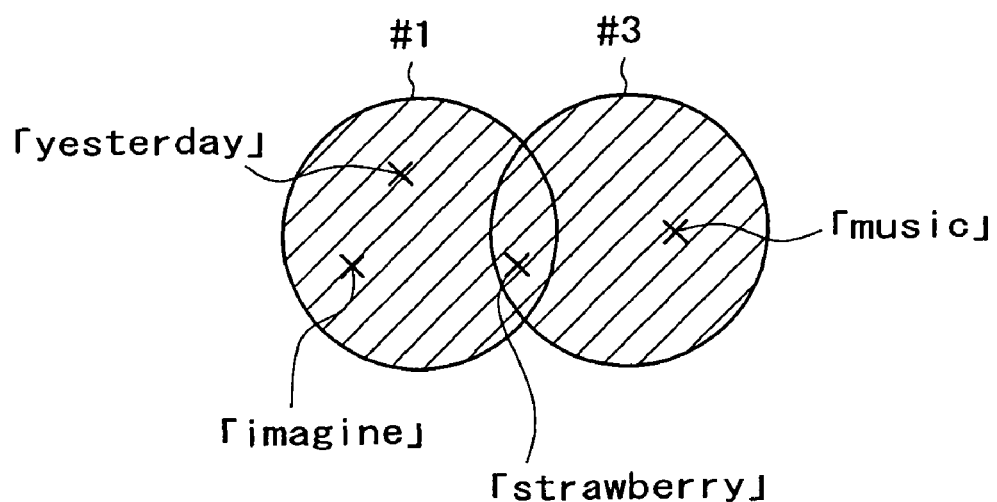
F I G. 4
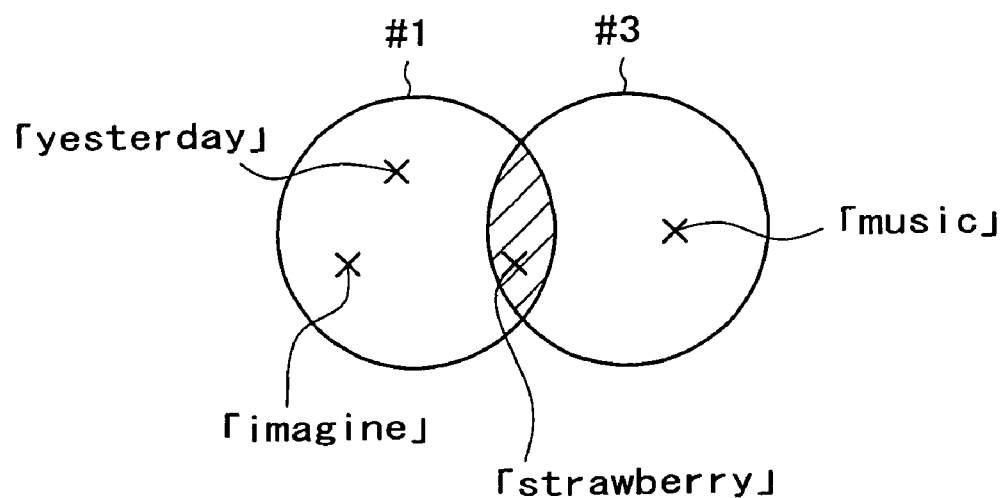

F I G. 1 6
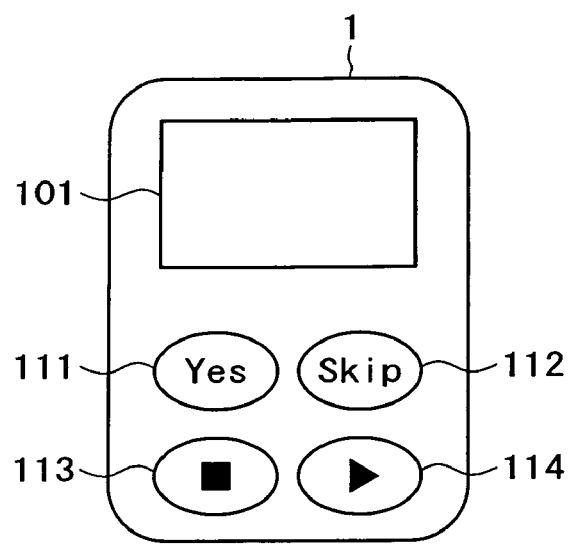
F I G. 1 7
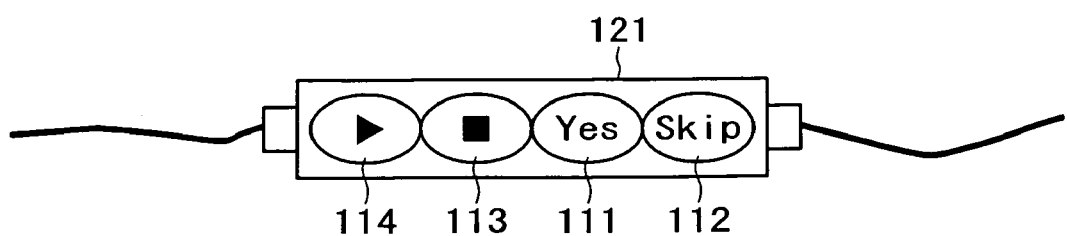

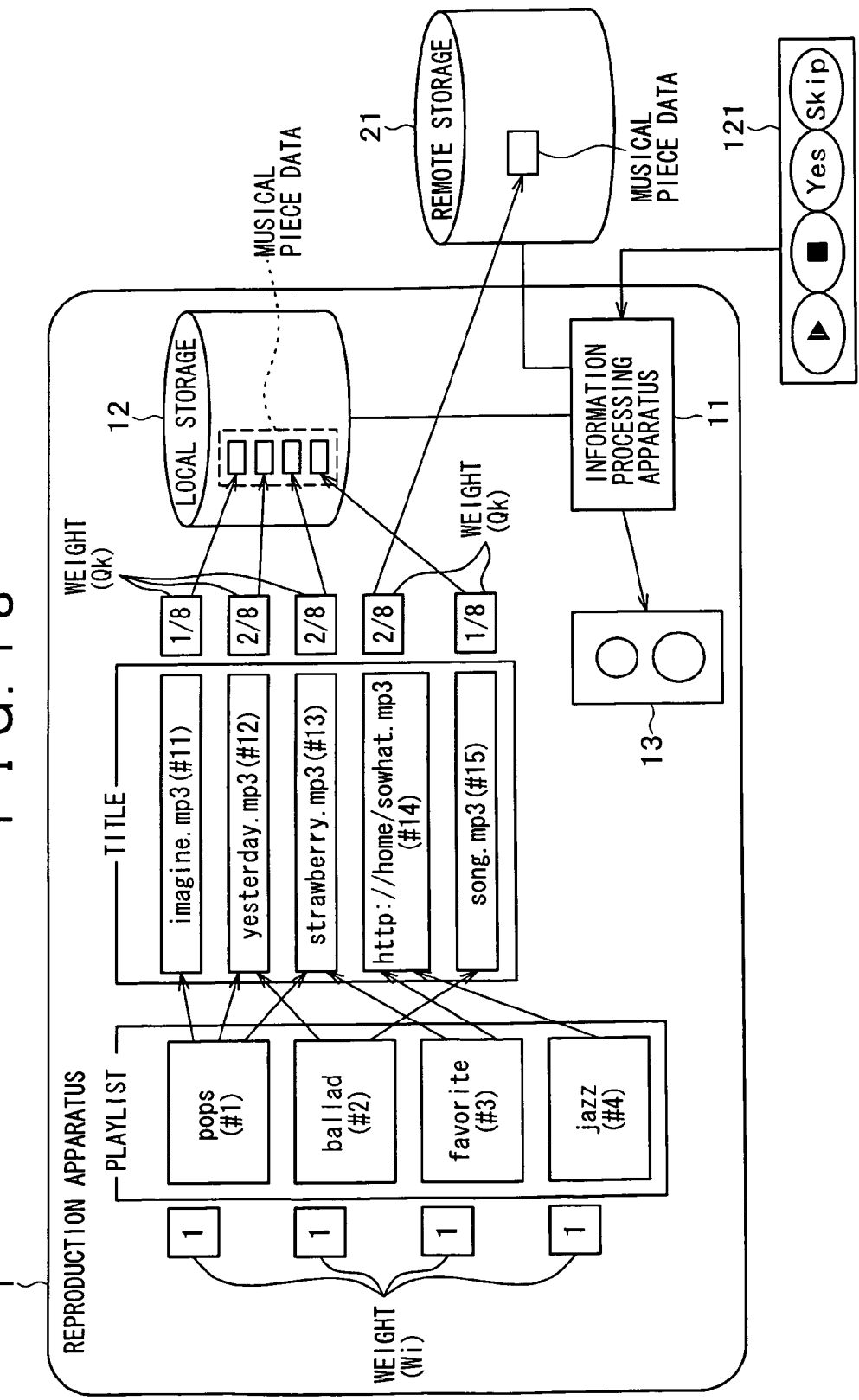

INFORMATION PROCESSING APPARATUS AND METHOD, AND PROGRAM

BACKGROUND OF THE INVENTION

The present invention relates to an apparatus and a method for information processing, and a program, and particularly to an apparatus and a method for information processing, and a program that can save trouble of specifying playlists a plurality of times and reduce a possibility of reproduction of a musical piece that does not suit a mood.

It has recently become common to store musical piece data in an MP3 (MPEG Audio Layer-3) format or an ATRAC (Adaptive Transform Acoustic Coding) format on a storage medium such as a hard disk, an optical disk, a semiconductor memory or the like, and listen to music by reproducing the musical piece data on a player.

With progresses made in lowering prices and increasing capacities of these storage media, a very large amount of data can be stored on the storage media without a very high cost being required. For example, some portable type players including a hard disk can store musical piece data equivalent to a few thousand CDs (Compact Disks).

The advent of such players has changed a style of listening to music. Specifically, a style of listening to music after setting a CD or the like in a player each time a user listens to the music has been generally changed to a style of specifying a playlist for categorizing musical pieces into different albums, different artists, or different genres, for example, the playlist being created in advance, and listening to music registered in the playlist.

In addition to being reproduced in order from a start, musical pieces registered in such a playlist are reproduced randomly. Thereby the user can reproduce the musical pieces registered in the playlist continuously in various orders.

Patent Document 1 discloses techniques of generating a playlist indicating order of audio information suited to preferences of a user. Patent Document 2 discloses techniques of enabling random reproduction with reproduction frequency taken into consideration.

[Patent Document 1]
Japanese Patent Laid-Open No. 2003-15666
[Patent Document 2]
Japanese Patent Laid-Open No. 2003-30969

In random reproduction of musical pieces, however, the user himself/herself does not specify the musical pieces to be reproduced, of course, and therefore musical pieces that do not suit a mood of the user at the time of the random reproduction may be reproduced.

In order to reduce this possibility as much as possible, it is possible to register only musical pieces that the user himself/herself really likes in a playlist and give an instruction to randomly reproduce the musical pieces registered in the playlist. In this case, however, when a relatively small number of musical pieces are registered in the playlist, reproduction of all the musical pieces registered in the playlist is finished soon, and thus it is necessary to specify a next playlist.

On the other hand, when too many musical pieces are registered in the playlist so as to save trouble of specifying a next playlist, a probability of reproduction of musical pieces that do not suit a mood is naturally increased as in a case where all musical pieces stored on a hard disk are set as an object of random reproduction.

That is, when one playlist is created with a limited number of musical pieces, reproduction of musical pieces that do not suit a mood can be prevented, whereas trouble of specifying a next playlist is required. On the other hand, when one playlist having many musical pieces registered therein is created, the trouble of specifying a next playlist can be saved, whereas a possibility of reproduction of musical pieces that do not suit a mood is increased.

SUMMARY OF THE INVENTION

The present invention has been made in view of the above. Accordingly, an object of the present invention is to make it possible to save the trouble of specifying a next playlist a plurality of times and reduce a possibility of reproduction of a musical piece that does not suit a mood.

According to the present invention, there is provided an information processing apparatus for controlling content reproduction on a basis of a first weight set to a playlist of contents and indicating a priority of the playlist and a second weight set to each of contents registered in playlists and indicating a priority of the content, the information processing apparatus including: a weight setting unit for, when a plurality of playlists are selected, updating a first weight set to each of the plurality of selected playlists and updating a second weight set to each of contents registered in the plurality of selected playlists according to one of a number of playlists in which each of the contents is registered and a specified reproduction method; and a reproduction controlling unit for controlling random content reproduction on a basis of the first weight and the second weight set by the weight setting unit.

When an instruction to perform is given, as the reproduction method, random reproduction using a sum of sets of contents registered in the plurality of selected playlists is given, the weight setting unit can update the second weights set to all the contents registered in the plurality of selected playlists.

When an instruction to perform is given, as the reproduction method, random reproduction using contents registered duplicately in the plurality of selected playlists is given, the weight setting unit can update the second weights set to the contents registered duplicately in the plurality of selected playlists.

When an instruction to update a weight of a content being reproduced is given by control of the reproduction controlling unit, the weight setting unit can update the first weights set to playlists in which the content being reproduced is registered so as to effect one of an increase and a decrease in the first weights according to a content of the instruction, and also update weights of other contents registered in the playlists in which the content being reproduced is registered on a basis of the updated first weights.

According to the present invention, there is provided an information processing method of an information processing apparatus for controlling content reproduction on a basis of a first weight set to a playlist of contents and indicating a priority of the playlist and a second weight set to each of contents registered in playlists and indicating a priority of the content, the information processing method including: a weight setting step for, when a plurality of playlists are selected, updating a first weight set to each of the plurality of selected playlists and updating a second weight set to each of contents registered in the plurality of selected playlists according to one of a number of playlists in which each of the contents is registered and a specified reproduction method; and a reproduction controlling step for controlling random content reproduction on a basis of the first weight and the second weight set by a process of the weight setting step.

According to the present invention, there is provided a program for making a computer perform a process for controlling content reproduction on a basis of a first weight set to a playlist of contents and indicating a priority of the playlist and a second weight set to each of contents registered in playlists and indicating a priority of the content, the program including: a weight setting step for, when a plurality of playlists are selected, updating a first weight set to each of the plurality of selected playlists and updating a second weight set to each of contents registered in the plurality of selected playlists according to one of a number of playlists in which each of the contents is registered and a specified reproduction method; and a reproduction controlling step for controlling random content reproduction on a basis of the first weight and the second weight set by a process of the weight setting step.

In the information processing apparatus and method and the program according to the present invention, when a plurality of playlists are selected, a first weight set to each of the plurality of selected playlists is updated and a second weight set to each of contents registered in the plurality of selected playlists is updated according to one of a number of playlists in which each of the contents is registered and a specified reproduction method. Also, random content reproduction is controlled on a basis of the set first weight and the set second weight.

According to the present invention, it is possible to randomly reproduce musical pieces suited to preferences of a user.

Further, according to the present invention, it is possible to select a plurality of playlists and thereby save the trouble of selecting playlists one by one.

BRIEF DESCRIPTION OF THE DRAWINGS

FIG. 3 is a diagram of assistance in explaining selection of musical pieces;

FIG. 4 is another diagram of assistance in explaining selection of musical pieces;

FIG. 16 is a diagram showing an example of an external appearance of a reproduction apparatus;

FIG. 17 is a diagram showing an example of an external appearance of a remote controller;

FIG. 18 is a diagram of a concept of updating of weights which updating is performed by the reproduction apparatus of FIG. 16;

DETAILED DESCRIPTION OF THE PREFERRED EMBODIMENTS

Preferred embodiments of the present invention will hereinafter be described. Correspondences between inventions described in the present specification and embodiments of the inventions are illustrated as follows. This description is to confirm that the embodiments supporting the inventions described in claims are described in the present specification. Therefore, even when there is an embodiment described in the embodiments of the inventions but not described here as corresponding to an invention, it does not signify that the embodiment does not correspond to the invention. Conversely, even when an embodiment is described here as corresponding to an invention, it does not signify that the embodiment does not correspond to inventions other than that invention.

Further, this description does not represent all the inventions described in the present specification. In other words, this description does not negate presence of inventions described in the present specification but not claimed in the present application, that is, presence of inventions for divisional application or to be added by amendments in the future.

Figure 1:
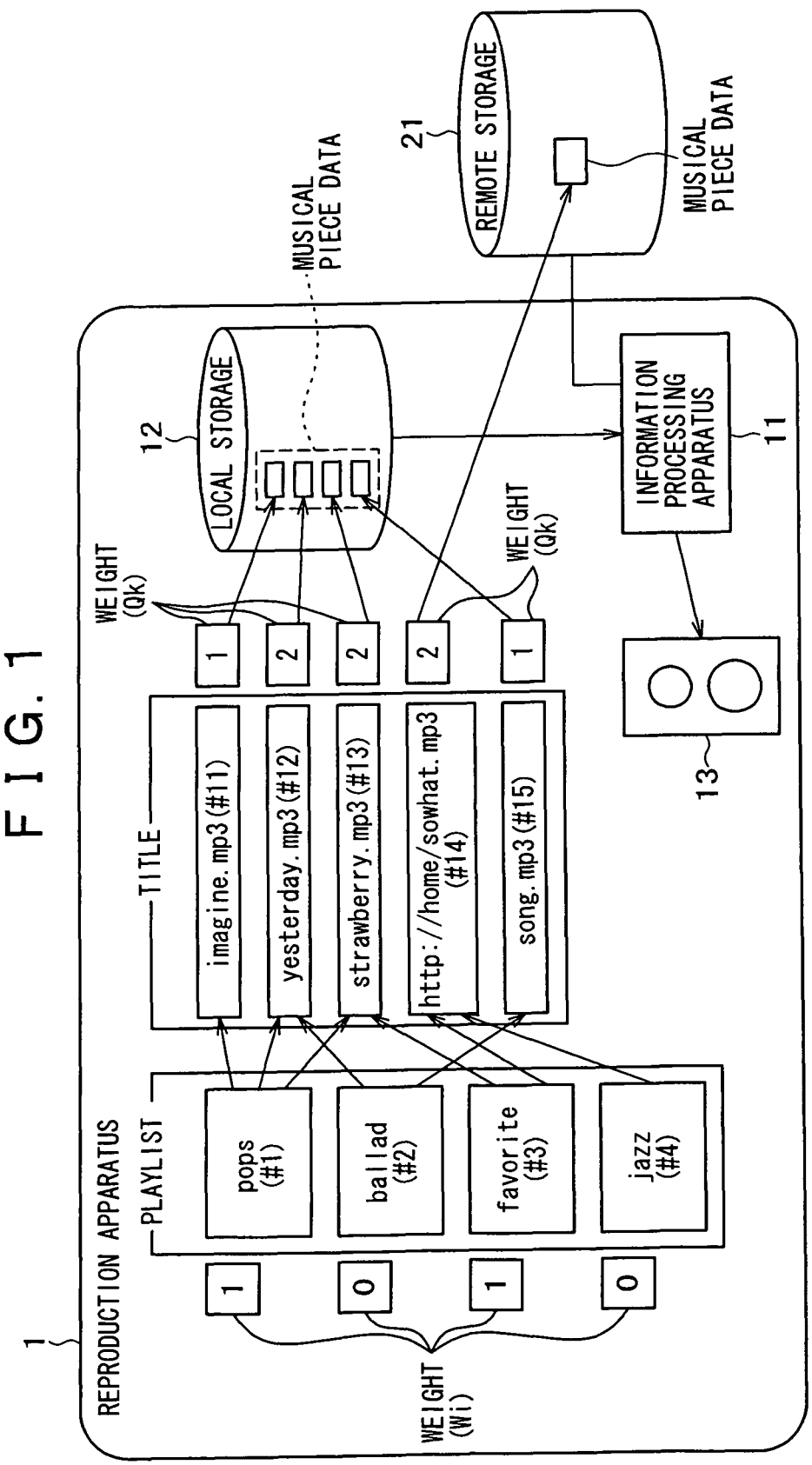
FIG. 1 is a diagram of a concept of musical piece reproduction performed by a reproduction apparatus 1 to which the present invention is applied.

An information processing apparatus as set forth in claim 1 is an information processing apparatus (for example an information processing apparatus 11 in FIG. 1) for controlling content reproduction on a basis of a first weight (for example a weight ($W_i$) in FIG. 1) set to a playlist of contents (for example music data or still picture data) and indicating a priority of the playlist and a second weight (for example a weight ($Q_k$) in FIG. 1) set to each of contents registered in playlists and indicating a priority of the content. The information processing apparatus includes: a weight setting unit (for example a weight setting unit 62 in FIG. 6) for, when a plurality of playlists are selected, updating a first weight set to each of the plurality of selected playlists and updating a second weight set to each of contents registered in the plurality of selected playlists according to one of a number of playlists in which each of the contents is registered (for example so as to set one to a content registered in one playlist and set to a content registered duplicately in a plurality of playlists the number of playlists in which the content is registered duplicately) and a specified reproduction method (for example a method of reproducing a sum of sets or a common part); and a reproduction controlling unit (for example a reproduction control unit 63 in FIG. 6) for controlling random content reproduction on a basis of the first weight and the second weight set by the weight setting unit.

When an instruction to perform, as the reproduction method, random reproduction using a sum of sets of contents registered in the plurality of selected playlists is given, the weight setting unit can update the second weights set to all the contents registered in the plurality of selected playlists (for example update weights set to contents included in a sum of sets of FIG. 3).

When an instruction to perform, as the reproduction method, random reproduction using contents registered duplicately in the plurality of selected playlists is given, the weight setting unit can update the second weights set to the contents registered duplicately in the plurality of selected playlists (for example update weights set to contents included in a common part of FIG. 4).

When an instruction to update a weight of a content being reproduced is given by control of the reproduction controlling unit (for example when a Yes button 111 or a Skip button 112 in FIG. 16 is pressed), the weight setting unit can update the first weights set to playlists in which the content being reproduced is registered so as to effect one of an increase and a decrease in the first weights according to a content of the instruction, and also update weights of other contents registered in the playlists in which the content being reproduced is registered on a basis of the updated first weights.

An information processing method as set forth in claim 5 is an information processing method of an information processing apparatus (for example an information processing apparatus 11 in FIG. 1) for controlling content reproduction on a basis of a first weight (for example a weight ($W_i$) in FIG. 1) set to a playlist of contents (for example music data or still picture data) and indicating a priority of the playlist and a second weight (for example a weight ($Q_k$) in FIG. 1) set to each of contents registered in playlists and indicating a priority of the content. The information processing method includes: a weight setting step (for example steps S12 and S13 in FIG. 8) for, when a plurality of playlists are selected, updating a first weight set to each of the plurality of selected playlists and updating a second weight set to each of contents registered in the plurality of selected playlists according to one of a number of playlists in which each of the contents is registered (for example so as to set one to a content registered in one playlist and set to a content registered duplicately in a plurality of playlists the number of playlists in which the content is registered duplicately) and a specified reproduction method (for example a method of reproducing a sum of sets or a common part); and a reproduction controlling step (for example step S14 in FIG. 8) for controlling random content reproduction on a basis of the first weight and the second weight set by a process of the weight setting step.

An embodiment (but one example) corresponding to each step in a program according to the present invention is the same as in the information processing method according to the present invention.

A preferred embodiment of the present invention will hereinafter be described with reference to the drawings.

FIG. 1 is a diagram of a concept of musical piece reproduction (music reproduction) by a reproduction apparatus 1 to which the present invention is applied.

The reproduction apparatus 1 is a music player of a portable type or a fixed type. The reproduction apparatus 1 has an information processing apparatus 11, a local storage 12, and an output unit 13. The information processing apparatus 11 controls operation of the whole of the reproduction apparatus 1.

The information processing apparatus 11 controls reproduction of musical piece data stored in the local storage 12, and manages playlists referred to at the time of the reproduction.

Playlists refer to lists for grouping musical pieces into each of various categories such as different artists, different genres or the like. Described in a playlist are a name of the playlist, titles (file names) of musical pieces registered in the playlist, information specifying storage locations of the musical piece data, and the like. Incidentally, playlists may include playlists obtained by grouping musical pieces on the basis of a reproduction history, such for example as "30 musical pieces recently reproduced", and playlists obtained by grouping on the basis of a property of the musical piece data itself or information described in tag information (attribute information) added to the musical piece data, such for example as "musical pieces having a total reproduction time of five minutes or less" and "musical pieces including 'AAA' as tag information."

In addition, the information processing apparatus 11 sets, to each playlist, a weight indicating a priority of the playlist. When an instruction for random reproduction of musical pieces is given by a user, the information processing apparatus 11 refers to the set weight so that musical pieces registered in a playlist having a higher weight set thereto are reproduced preferentially.

Playlists may be created by the user operating an input unit of the reproduction apparatus 1, or playlists created by another player possessed by the user may be supplied to the reproduction apparatus 1. Further, playlists may be provided from a server connected via a network.

In an example of FIG. 1, a weight of "1" is set to a playlist #1 as a playlist to which a name of "pops" is set. A weight of "0" is set to a playlist #2 as a playlist to which a name of "ballad" is set. A weight of "1" is set to a playlist #3 as a playlist to which a name of "favorite" is set. A weight of "0" is set to a playlist #4 as a playlist to which a name of "jazz" is set.

In addition, in the example of FIG. 1, registered in the playlist #1 are a title #11 of musical piece data having a file name of "imagine.mp3" set thereto (musical piece data in an MP3 format), a title #12 of musical piece data having a file name of "yesterday.mp3" set thereto, and a title #13 of musical piece data having a file name of "strawberry.mp3" set thereto. Registered in the playlist #2 are the title #12 and a title #15 of musical piece data having a file name of "song.mp3" set thereto. Further, registered in the playlist #3 are the title #13 and a title #14 of musical piece data whose storage location is specified by a URL (Uniform Resource Locator) of "http://home/sowhat.mp3." Registered in the playlist #4 is the title #14.

Figure 2:
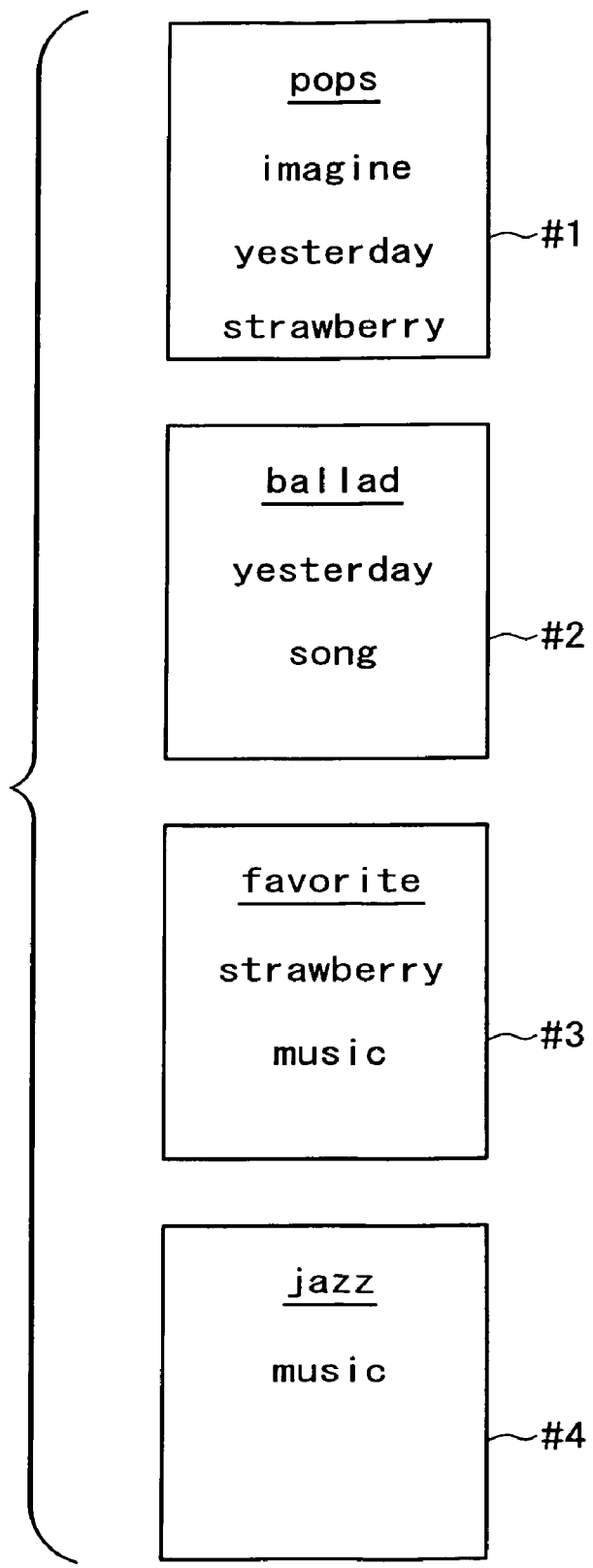
FIG. 2 is a diagram showing an example of playlists.

Thus, the playlists #1 to #4 in FIG. 1 have musical pieces as shown in FIG. 2 registered therein. In FIG. 2, playlist names and titles (parts obtained by removing extensions from the titles in FIG. 1) are associated with each other. The playlist #1 has "imagine", "yesterday", and "strawberry" registered therein. The playlist #2 has "yesterday" and "song" registered therein. The playlist #3 has "strawberry" and "music" (the title #14 in FIG. 1) registered therein. The playlist #4 has "music" registered therein.

The information processing apparatus 11 sets a weight different from the weight of a playlist to each of the titles (musical pieces) registered in the playlists.

For example, a weight of "1" is set to a musical piece registered in one playlist, and a weight of "2" is set to a musical piece registered duplicately in two playlists. As shown in FIG. 1, the weight of "1" is set to the title #11 and the title #15, and the weight of "2" is set to the titles #12 to #14.

At the time of random reproduction of musical pieces, consideration is given to not only the weights of the playlists but also the weight of each musical piece, and thus a possibility of reproduction of the title #13 (strawberry) having the weight of 2 set thereto, for example, is twice that of reproduction of the title #11 (imagine) having the weight of "1" set thereto.

In the example of FIG. 1, the musical piece data of the titles #11 to #13 and the title #15 of the above-described titles is stored in the local storage 12 included in the reproduction apparatus 1, and the musical piece data of the title #14 is stored in a remote storage 21 connected to the information processing apparatus 11 via a network. At the time of reproduction of the title #14, the information processing apparatus 11 obtains the musical piece data of the title #14 from the remote storage 21 via the network, and then reproduces the title #14.

Thus, the user can reproduce musical piece data stored in a storage other than the local storage 12 included in the reproduction apparatus 1 by using the reproduction apparatus 1.

Also, the user can select a plurality of playlists from the playlists managed by the information processing apparatus 11, and randomly reproduce musical pieces registered in the playlists.

For example, when the user selects the playlist #1 and the playlist #3 from a list of playlists and gives an instruction for random reproduction of musical pieces, "1" is set as the weights of the selected playlists #1 and #3, as shown in FIG. 1. A default value of "0" is set to the other playlists, that is, the playlist #2 and the playlist #4.

Musical pieces registered in the playlists having the weight of "0" are not reproduced, and musical pieces registered in the playlist #1 and the playlist #3 having the weight of "1" set thereto are randomly reproduced.

FIG. 3 is a diagram of assistance in explaining musical piece selection when the playlist #1 and the playlist #3 are selected and an instruction to perform, as a reproduction method, random reproduction of a sum of sets of musical pieces registered in these playlists is given.

The playlist #1 has "imagine", "yesterday", and "strawberry" registered therein, and the playlist #3 has "strawberry" and "music" registered therein. In this case, the information processing apparatus 11 randomly reproduces musical pieces with the whole of the sum of sets of these musical pieces represented by hatch lines as an object of the random reproduction (selects a musical piece from among the musical pieces in the part represented by the hatch lines).

At the time of selection of musical pieces, consideration is given to the weight of each musical piece. As described above, a higher weight is set to a musical piece ("strawberry" in the case of FIG. 3) registered duplicately in a plurality of playlists.

Thus, since a plurality of playlists can be selected at a time, the need for the user to select playlists one at a time is eliminated, and musical pieces can be randomly reproduced successively over a long period of time until reproduction of all musical pieces registered in the plurality of selected playlists is completed. Further, since musical pieces are selected with consideration given to the weight set to each musical piece, probability of reproduction of a musical piece registered duplicately in a plurality of playlists, for example, is increased, so that the random reproduction more suits preferences of the user.

FIG. 4 is a diagram of assistance in explaining musical piece selection when the playlist #1 and the playlist #3 are selected and an instruction to perform, as a reproduction method, random reproduction of a common part of these playlists is given.

In this case, the information processing apparatus 11 randomly reproduces musical pieces with musical pieces in the common part having hatch lines attached thereto among the musical pieces registered in the playlist #1 and the playlist #3 as an object of the random reproduction.

While in the example of FIG. 4, only "strawberry" is shown as a musical piece in the common part of the playlist #1 and the playlist #3, by registering a larger number of musical pieces in each of the playlists, random reproduction is performed with only musical pieces highly likely to be a particular favorite of the user as an object of the random reproduction. Users have a strong tendency to register a musical piece as their particular favorite duplicately in a plurality of playlists.

Thus, since a plurality of playlists can be selected at a time, the information processing apparatus 11 can readily recognize the musical pieces highly likely to be the particular favorites of the user from the overlapping parts of the plurality of playlists.

Incidentally, the reproduction apparatus 1 can simply perform random reproduction with all of musical pieces that is stored in the local storage 12 and the remote storage 21 and accessible by the reproduction apparatus 1 as an object of the random reproduction without playlists being selected. In this case, the weight of "1" is set to all playlists, and musical pieces are selected on the basis of the weight set to each musical piece.

Details of creation of playlists and selection of musical pieces will be described later with reference to flowcharts.

Figure 5:
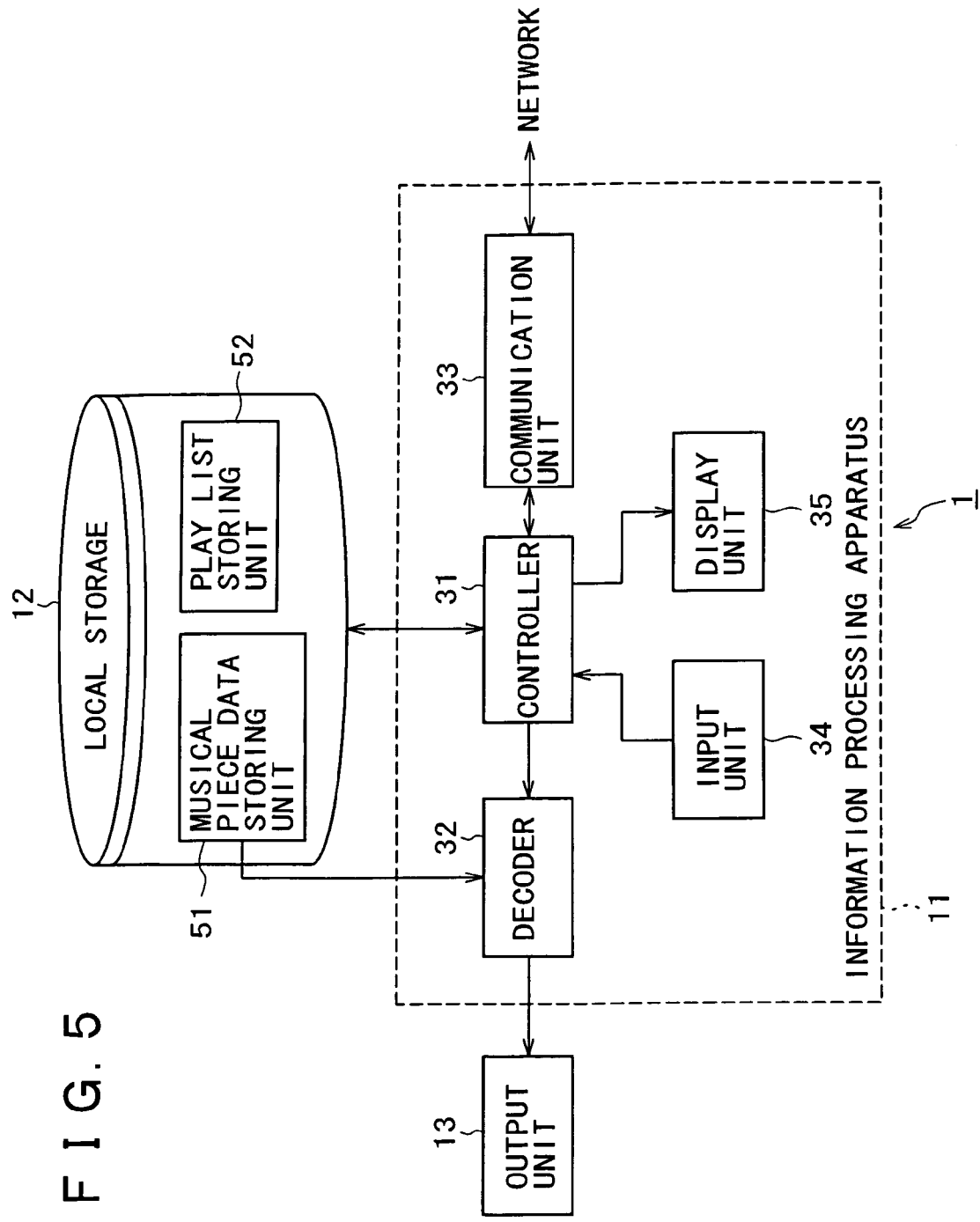
FIG. 5 is a block diagram showing an example of configuration of a reproduction apparatus.

FIG. 5 is a block diagram showing an example of configuration of the reproduction apparatus 1.

A controller 31 controls the whole of the information processing apparatus 11 according to a predetermined control program. For example, the controller 31 displays a playlist selecting screen on a display unit 35, and receives a playlist selected by operating an input unit 34. The selecting screen displayed on the display unit 35 displays a list of playlists stored in a playlist storing unit 52, for example. In addition, the controller 31 provides a designation of a musical piece to be reproduced to a decoder 32, and controls a communication unit 33 to perform communication via a network.

The decoder 32 reads data of a musical piece selected by the controller 31 from a musical piece data storing unit 51, and decodes the data according to a format of the data. A musical piece signal obtained by decoding the data is output to an output unit 13.

The communication unit 33 performs communication with an apparatus external to the reproduction apparatus 1 via a wire network or a radio network. For example, when the controller 31 instructs the communication unit 33 to obtain musical piece data stored in the remote storage 21, the communication unit 33 accesses the remote storage 21 via the network and then obtains the musical piece data. The communication unit 33 outputs the obtained musical piece data to the controller 31.

The input unit 34 includes a reproduction button operated to start reproduction of a musical piece, a stop button operated to stop a musical piece being reproduced, and the like. The input unit 34 outputs a signal corresponding to the operated button to the controller 31. When the input unit 34 is a touch panel provided by laminating a layer on the display unit 35, the input unit 34 detects touching of a surface of the display unit 35 by the user, and outputs a signal indicating the touching of the surface of the display unit 35 by the user to the controller 31.

The display unit 35 includes an LCD (Liquid Crystal Display) or the like. Under control of the controller 31, the display unit 35 displays a playlist creating screen and a playlist selecting screen.

The local storage 12 includes a hard disk, a flash memory or the like. The local storage 12 includes the musical piece data storing unit 51 for storing musical piece data and the playlist storing unit 52 for storing playlists. The musical piece data stored in the musical piece data storing unit 51 is read by the decoder 32 as required, and the playlists stored in the playlist storing unit 52 are read by the controller 31 as required.

The output unit 13 includes a speaker, an earphone, or the like. The output unit 13 outputs a musical piece decoded by the decoder 32.

Figure 6:
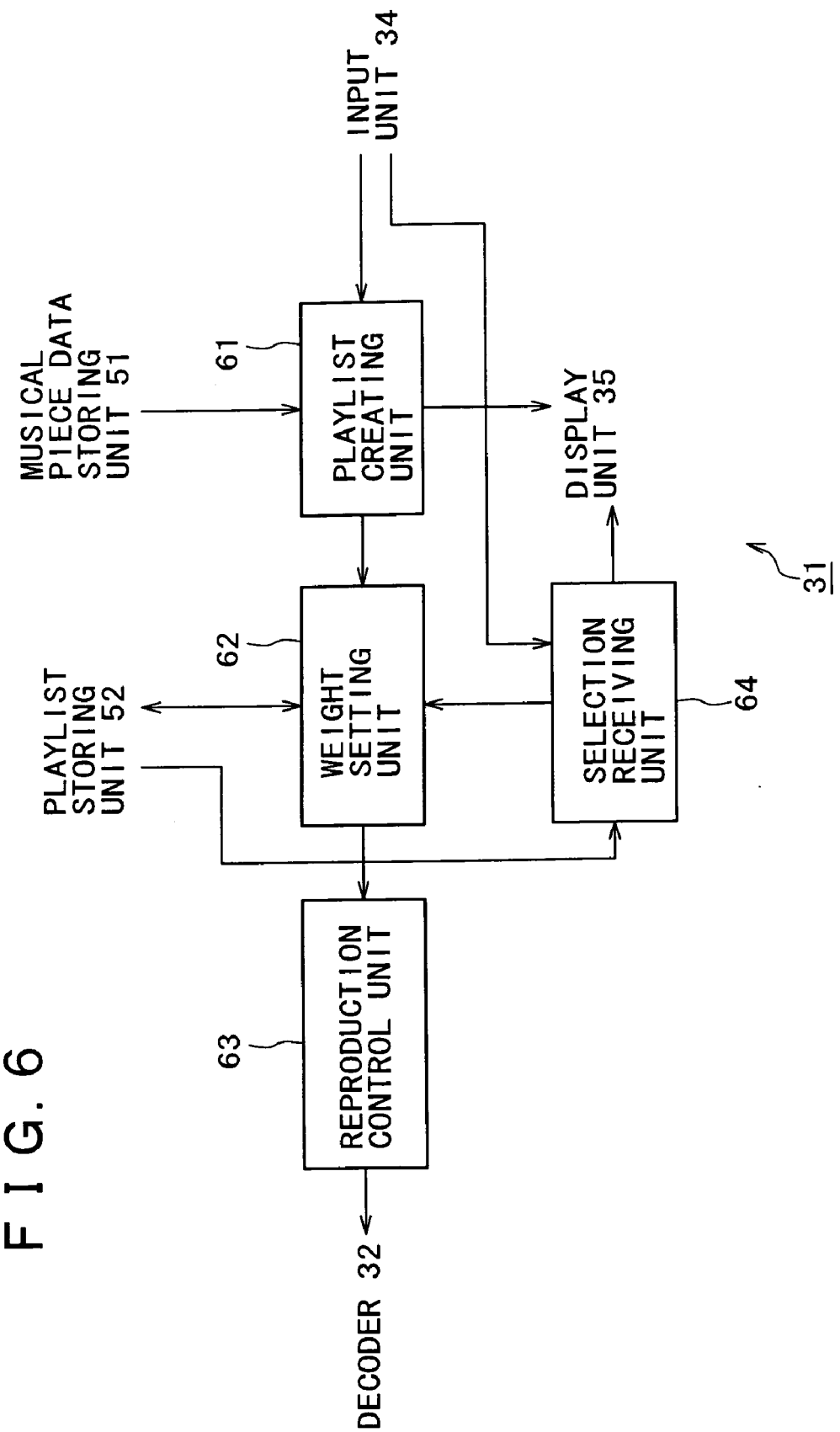
FIG. 6 is a block diagram showing an example of functional configuration of a controller in FIG. 5.

FIG. 6 is a block diagram showing an example of functional configuration of the controller 31 in FIG. 5.

A playlist creating unit 61 for example displays a playlist creating screen on the display unit 35, creates a playlist on the basis of input to the input unit 34 from the user, and then outputs the created playlist to a weight setting unit 62. The playlist creating screen displays a list of titles of musical pieces whose musical piece data is stored in the musical piece data storing unit 51, for example. Thus, the user creates a playlist by entering a playlist name and selecting musical pieces to be registered from the list.

In addition, when the playlist creating unit 61 controls the communication unit 33 to be connected to the network and then obtains a playlist distributed by a predetermined server, the playlist creating unit 61 also outputs the playlist to the weight setting unit 62.

The weight setting unit 62 sets weights to all playlists created by the playlist creating unit 61 (or provided from the server) and each of musical pieces registered in the playlists. The playlists to which the weights are set by the weight setting unit 62 are outputted to the playlist storing unit 52, and then stored in the playlist storing unit 52. In addition, when the user selects playlists as an object for random reproduction, the weight setting unit 62 updates the weights of the selected playlists. Further, the weight setting unit 62 reads the playlists selected by the user from the playlist storing unit 52, and then outputs the playlists to a reproduction control unit 63.

When an instruction to randomly reproduce musical pieces is given, for example, the reproduction control unit 63 randomly selects one musical piece as described with reference to FIG. 3 or FIG. 4 or with all the musical pieces stored in the musical piece data storing unit 51 as an object of the random reproduction, and then instructs the decoder 32 to reproduce the selected musical piece. The decoder 32 reads data of the musical piece selected by the reproduction control unit 63 from the musical piece data storing unit 51, and then starts decoding the data.

A selection receiving unit 64 displays a list of playlists stored in the playlist storing unit 52 to allow the user to make a selection. When a playlist is selected from the list of playlists, the selection receiving unit 64 receives the selection, and then notifies the selected playlist to the weight setting unit 62.

Operations of the controller 31 having the above-described configuration will next be described with reference to flowcharts.

Figure 7:
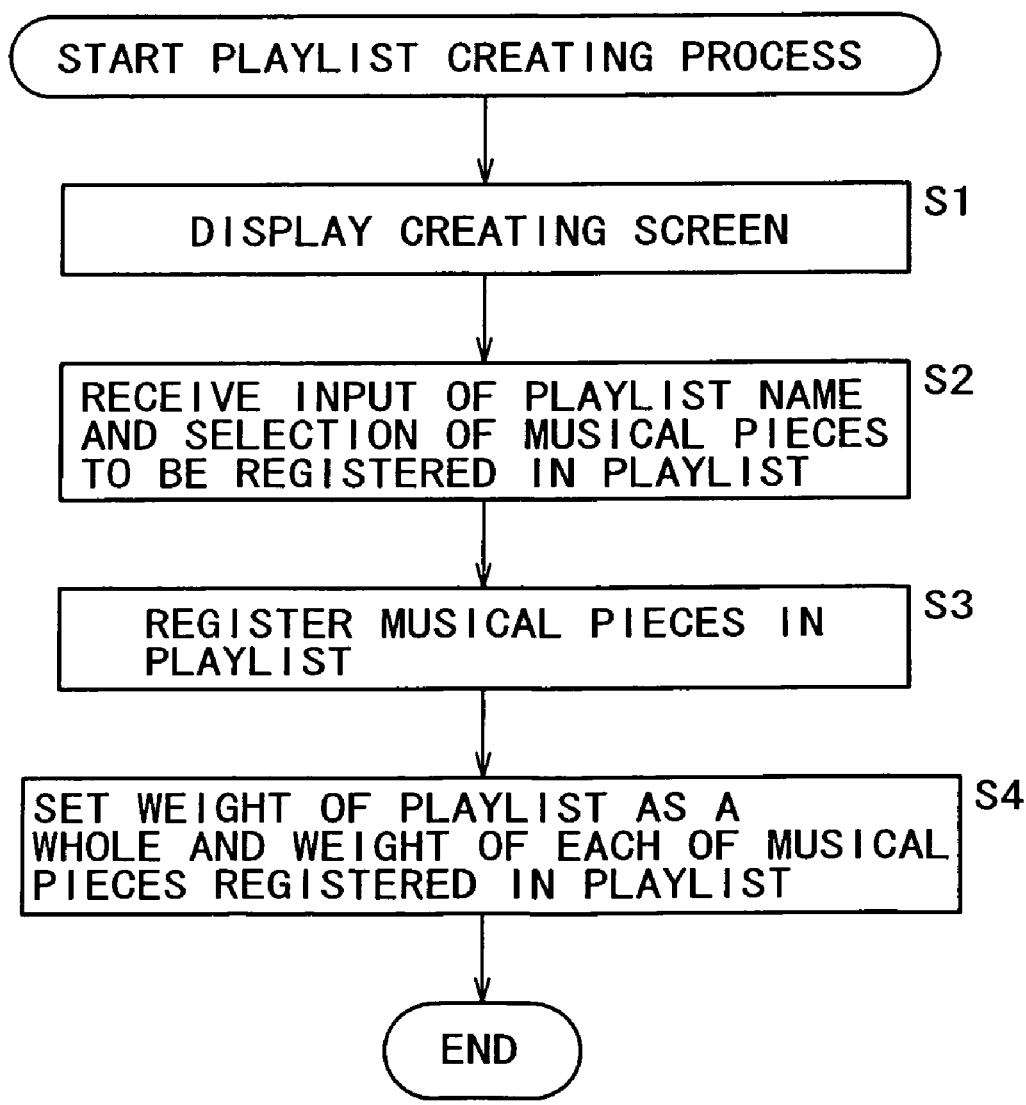
FIG. 7 is a flowchart of assistance in explaining a playlist creating process of the controller.

First, a playlist creating process of the controller 31 will be described with reference to a flowchart of FIG. 7.

In step S1, the playlist creating unit 61 displays a playlist creating screen including a list of musical pieces whose musical piece data is stored in the musical piece data storing unit 51 on the display unit 35. Incidentally, when the accessible remote storage 21 is present outside the reproduction apparatus 1, as shown in FIG. 1, the list of playlists displayed on the playlist creating screen includes musical pieces stored in the remote storage 21. The user inputs a playlist name from the displayed creating screen by operating the input unit 34, for example, and selects musical pieces to be registered in the playlist from the list.

The playlist creating unit 61 in step S2 receives the playlist name inputted by operating the input unit 34 and the selection of the musical pieces to be registered in the playlist. The process proceeds to step S3, where the playlist creating unit 61 registers the musical pieces in the playlist. At this time, each musical piece is associated with information specifying a storage location of data of the musical piece registered in the playlist. The playlist created by the playlist creating unit 61 is output to the weight setting unit 62.

In step S4, the weight setting unit 62 sets a weight of the playlist as a whole and a weight of each of the musical pieces registered in the playlist. In a default state, for example, the weight of the playlist as a whole and the weight of each of the musical pieces are each set as "0." The playlist having the weight set thereto is outputted to the playlist storing unit 52, and then stored in the playlist storing unit 52.

As a result of repeating the above-described process, the playlists #1 to #4 in FIG. 1, for example, are created and provided as playlists selectable at the time of reproduction in the reproduction apparatus 1.

Figure 8:
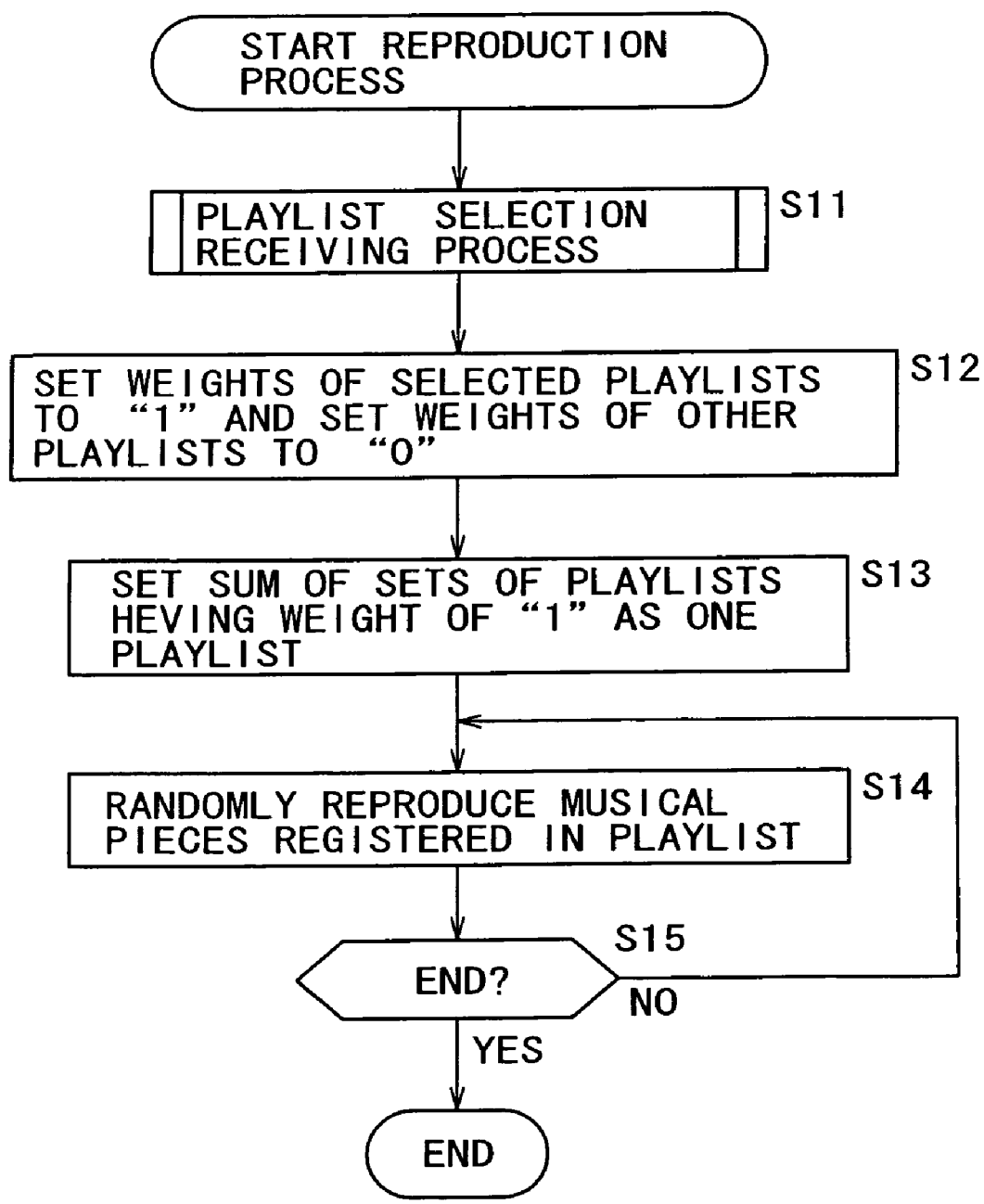
FIG. 8 is a flowchart of assistance in explaining a musical piece reproducing process of the controller.

A musical piece reproducing process of the controller 31 will next be described with reference to a flowchart of FIG. 8.

In step S11, the selection receiving unit 64 performs a playlist selection receiving process. For example, the selection receiving unit 64 displays a selecting screen including a list of playlists stored in the playlist storing unit 52 on the display unit 35, and receives playlists selected by the user from the selecting screen. The selection receiving process performed in step S11 will be described later with reference to flowcharts of FIG. 11 and FIG. 15.

In step S12, the weight setting unit 62 sets the weights of the playlists selected by the user to "1" and sets the weights of the other playlists to "0" (leaves the weights of the other playlists at the default). Thereby musical pieces registered in the playlists having the weight of "1" set thereto become an object of random reproduction. Information on the playlists having the weight set thereto is output to the reproduction control unit 63.

In step S13, the reproduction control unit 63 sets the playlists having the weight of "1" set thereto, that is, a sum of the playlists selected by the user as one virtual playlist. The process proceeds to step S14, where the reproduction control unit 63 performs random reproduction by sequentially selecting musical pieces one by one with all of the musical pieces registered in the virtual playlist as an object of the random reproduction.

Hence, when as shown in FIG. 3, the playlist #1 and the playlist #3 are selected and an instruction to perform random reproduction of a sum of sets of the musical pieces registered in the playlist #1 and the playlist #3 is given, for example, the random reproduction is performed by selecting from "imagine", "yesterday", "strawberry", and "music". At this time, as described above, "strawberry" in FIG. 3 registered duplicately in the plurality of playlists is reproduced with a higher probability.

In step S15, the reproduction control unit 63 determines whether an instruction to end the random reproduction is given by the user. Until the reproduction control unit 63 determines that an instruction to end the random reproduction is given by the user, the process returns to step S14 to repeat the random reproduction. When the reproduction control unit 63 determines in step S15 that an instruction to end the random reproduction is given by the user, the process is ended.

Figure 9:
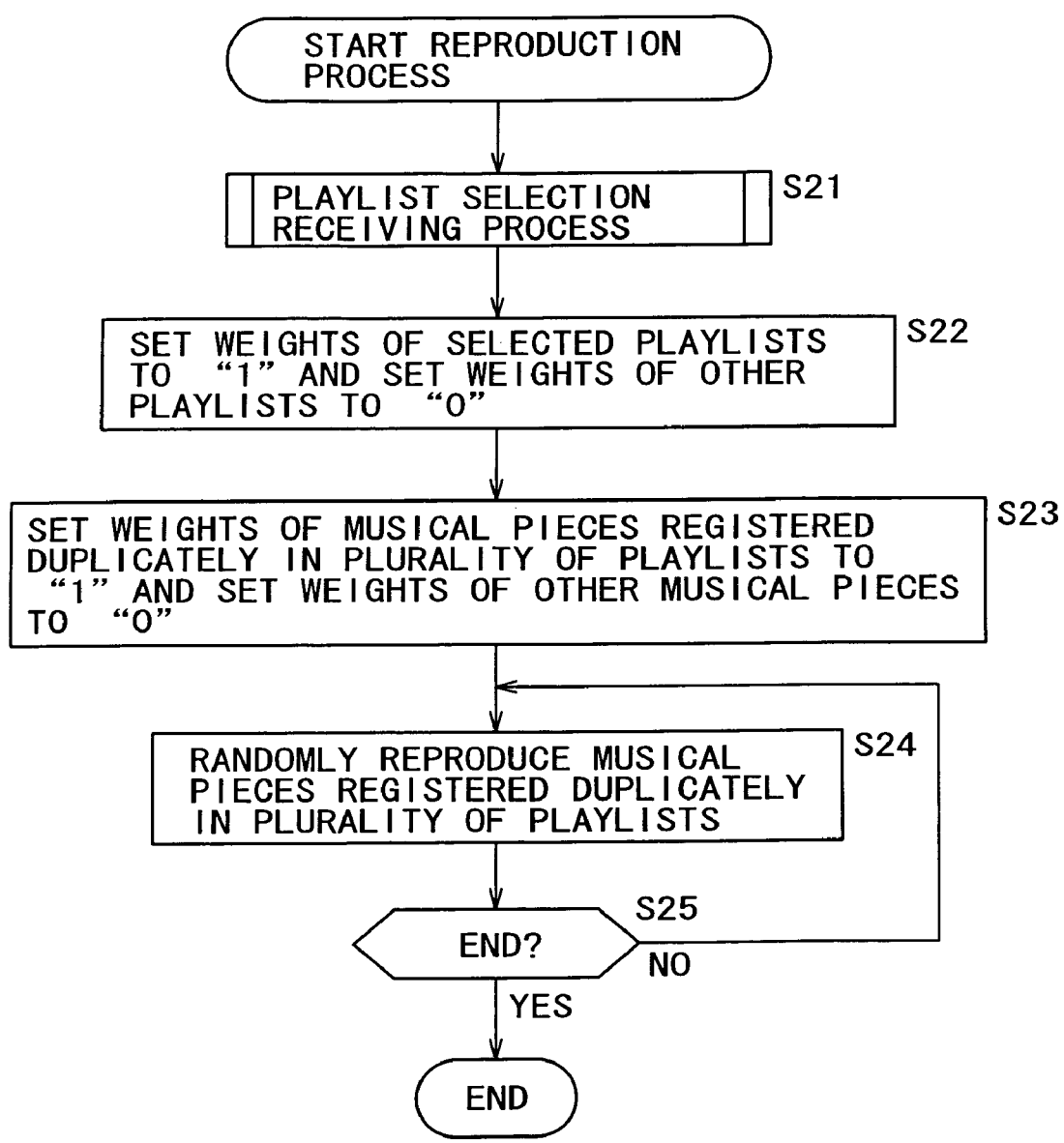
FIG. 9 is a flowchart of assistance in explaining another musical piece reproducing process of the controller.

Another process of musical piece reproduction of the controller 31 will next be described with reference to a flowchart of FIG. 9.

In step S21, the selection receiving unit 64 performs a playlist selection receiving process. The selection receiving process performed in step S21 is the same as the process performed in step S11 in FIG. 8, and details of the process will be described later with reference to flowcharts of FIG. 11 and FIG. 15.

In step S22, the weight setting unit 62 sets the weights of the playlists selected by the user to "1" and sets the weights of the other playlists to "0." Thereby musical pieces registered in the playlists having the weight of "1" set thereto become an object of random reproduction.

In step S23, the weight setting unit 62 sets the weights of musical pieces registered duplicately in the plurality of playlists among musical pieces registered in the playlists having the weight of "1" set thereto to "1" and sets the weights of the other musical pieces registered in only one playlist to "0." Information on the playlists having the weight set thereto is output to the reproduction control unit 63.

In step S24, the reproduction control unit 63 performs random reproduction with only the musical pieces having the weight of "1" set thereto, that is, the musical pieces registered duplicately in the plurality of playlists selected by the user as an object of the random reproduction.

Hence, when as shown in FIG. 4, the playlist #1 and the playlist #3 are selected and an instruction to perform random reproduction of the musical pieces registered duplicately in the playlist #1 and the playlist #3 is given, for example, the weight of "1" is set to the musical pieces in the common part represented by the hatch lines (for example "strawberry") among "imagine", "yesterday", "strawberry", and "music", and the random reproduction is performed by selecting from the musical pieces in the common part.

In step S25, the reproduction control unit 63 determines whether an instruction to end the random reproduction is given by the user. Until the reproduction control unit 63 determines that an instruction to end the random reproduction is given by the user, the process returns to step S24 to repeat the random reproduction. When the reproduction control unit 63 determines in step S25 that an instruction to end the random reproduction is given by the user, the process is ended.

Figure 10:
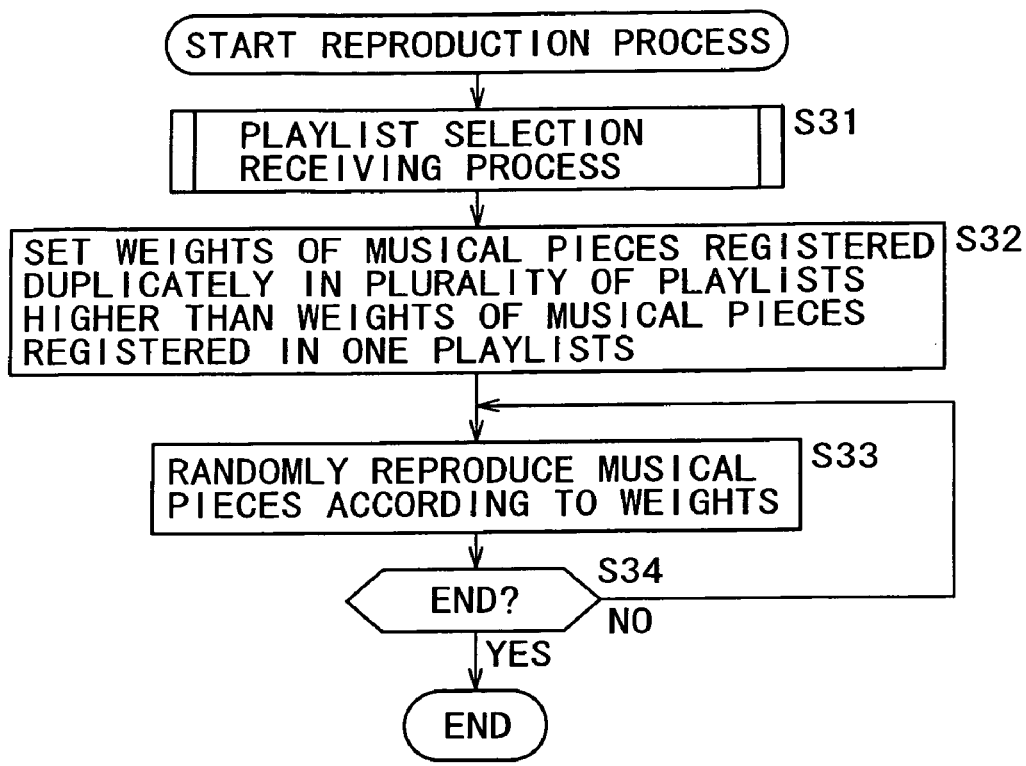
FIG. 10 is a flowchart of assistance in explaining a further musical piece reproducing process of the controller.

A further process of musical piece reproduction of the controller 31 will next be described with reference to a flowchart of FIG. 10.

In step S31, the selection receiving unit 64 performs a playlist selection receiving process. The selection receiving process performed in step S31 is the same as the process performed in step S11 in FIG. 8 and step S21 in FIG. 9, and details of the process will be described later with reference to flowcharts of FIG. 11 and FIG. 15.

In step S32, when a plurality of playlists are selected by the user, the weight setting unit 62 sets the weights of musical pieces registered duplicately in the plurality of playlists higher than the weights of musical pieces registered in only one playlist.

For example, the weight of "1" is set to the musical pieces registered in only one playlist, and the weight of "2" is set to the musical pieces registered duplicately in the plurality of playlists. Further, to a musical piece registered duplicately in still more playlists, a higher weight is set according to the number of playlists in which the musical piece is duplicately registered. The playlists having weights set thereto are output to the reproduction control unit 63.

The reproduction control unit 63 in step S33 sequentially selects musical pieces according to their weights to perform random reproduction. For example, the musical pieces are divided into groups in each of which musical pieces have the same weight set thereto, and random reproduction is started from a group of musical pieces having the highest weight set thereto. When the reproduction of all the musical pieces having the highest weight set thereto is finished, random reproduction is started from a group of musical pieces having the next highest weight set thereto. Since reproduction according to the weights is performed, musical pieces are reproduced according to preference of the user.

In step S34, the reproduction control unit 63 determines whether an instruction to end the random reproduction is given by the user. Until the reproduction control unit 63 determines that an instruction to end the random reproduction is given by the user, the process returns to step S33 to repeat the random reproduction by sequentially selecting musical pieces. When the reproduction control unit 63 determines in step S34 that an instruction to end the random reproduction is given by the user, the process is ended.

The playlist selecting process performed in step S11 in FIG. 8, step S21 in FIG. 9, and step S31 in FIG. 10 will next be described with reference to a flowchart of FIG. 11.

In step S41, the selection receiving unit 64 displays a list of playlists stored in the playlist storing unit 52 on the display unit 35.

Figure 12:
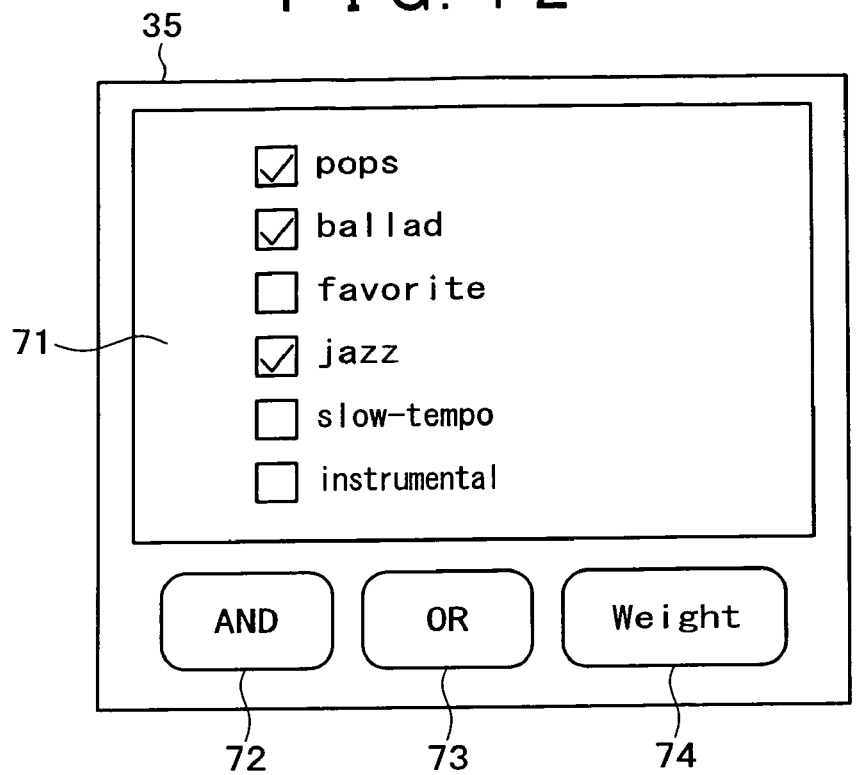
FIG. 12 is a diagram showing an example of display of a list of playlists.

FIG. 12 is a diagram showing an example of a list of playlists displayed on the display unit 35.

As shown in FIG. 12, a list 71 of names (playlist names) of the playlists stored in the playlist storing unit 52 is displayed. The user can select a playlist by checking a check box displayed adjacently on a left side of a name of the playlist by tapping a stylus as an accessory to the reproduction apparatus 1 or the like, for example. That is, in this case, a touch panel is laminated on the display unit 35.

In the example of FIG. 12, playlist names of "pops", "ballad", "favorite", "jazz", "slow-temp", and "instrumental" are displayed from the top, and among them, "pops", "ballad", and "jazz" are selected (check boxes are checked).

Displayed below the list 71 are an AND button 72 operated to set a sum of sets of musical pieces registered in a plurality of playlists as an object of random reproduction, an OR button 73 operated to set a common part of a plurality of playlists as an object of random reproduction, and a Weight button 74 operated to set higher weights to musical pieces registered duplicately in a plurality of playlists and perform random reproduction according to the set weights.

Thus, when a plurality of playlists are selected from the list 71 and the AND button 72 is pressed, the reproduction process described with reference to FIG. 8 (the process from step S12 on down) is performed. When the OR button 73 is pressed, the reproduction process described with reference to FIG. 9 (the process from step S22 on down) is performed. When a plurality of playlists are selected from the list 71 and the Weight button 74 is pressed, the reproduction process described with reference to FIG. 10 (the process from step S32 on down) is performed.

Figure 13:
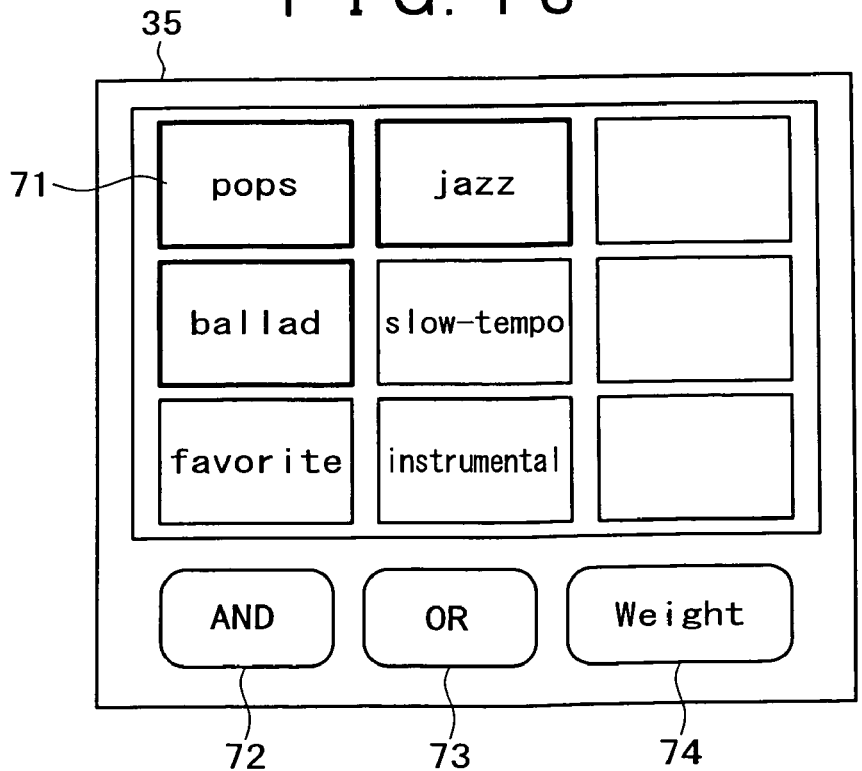
FIG. 13 is a diagram showing another example of display of a list of playlists.

FIG. 13 is a diagram showing another example of a list of playlists displayed on the display unit 35. As shown in the figure, the list 71 may include buttons operated to select a playlist.

Figure 11:
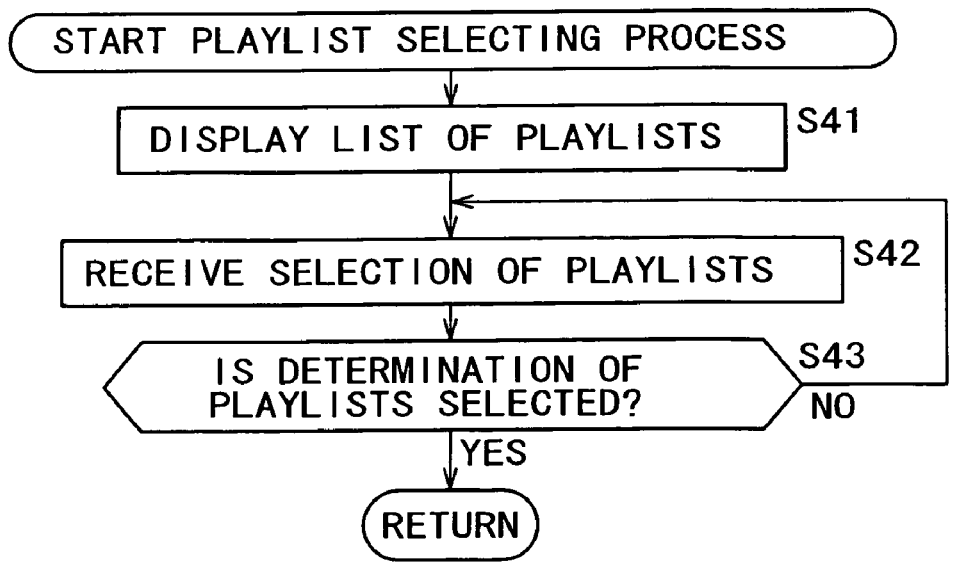
FIG. 11 is a flowchart of assistance in explaining details of a playlist selecting process.

Returning to the description of FIG. 11, the selection receiving unit 64 in step S42 receives a selection of playlists on the basis of input to the list 71 as shown in FIG. 12 or FIG. 13 from the user. The selection receiving unit 64 proceeds to step S43 to determine whether determination of the playlists is selected.

When the selection receiving unit 64 determines in step S43 that determination of the playlists is not selected, the selection receiving unit 64 returns to step S42 to repeat reception of a selection of playlists by the user.

When the selection receiving unit 64 determines in step S43 that determination of the playlists is selected because one of the AND button 72, the OR button 73, and the Weight button 74 is pressed, the subsequent process is performed. Specifically, when the AND button 72 is pressed, the process from step S12 on down in FIG. 8 is performed. When the OR button 73 is pressed, the process from step S22 on down in FIG. 9 is performed. When the Weight button 74 is pressed, the process from step S32 on down in FIG. 10 is performed.

Figure 14:
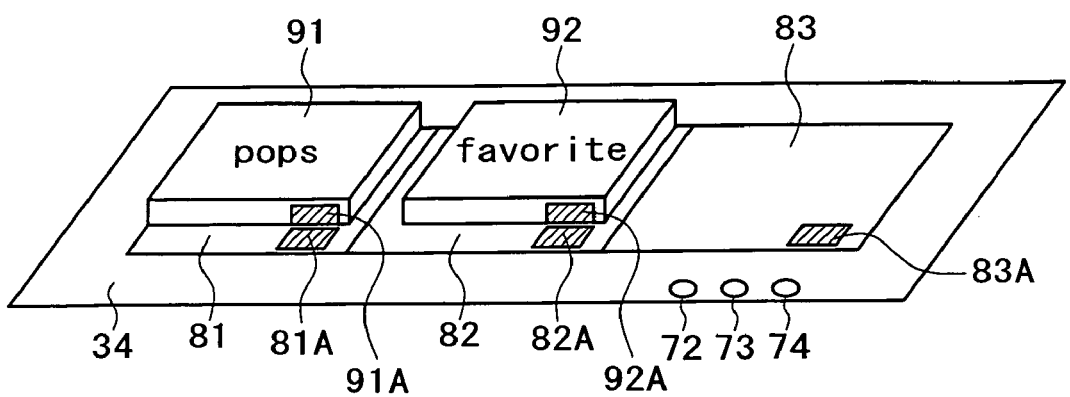
FIG. 14 is a diagram showing an example of an input unit.

While playlists are selected from the list as shown in FIG. 12 or FIG. 13 in the above description, playlists may be selected by a tool for selecting playlists as shown in FIG. 14, for example.

On an input unit 34 in FIG. 14 as a tool for selecting playlists, three areas 81 to 83 for mounting tile-shaped objects (hereinafter referred to as data tiles) are formed. The user selects playlists by mounting data tiles retaining playlist information on the areas.

A data tile has an RFID (Radio Frequency Identification) tag affixed to a predetermined position of the data tile. The RFID tag retains information on a playlist created by the user. A playlist name is written on an upper surface of the data tile so that the user can grasp at a glance which playlist information the data tile (the affixed RFID tag) retains. That is, in this case, the user needs to register playlist information with the data tile, for example.

In the example of FIG. 14, a data tile 91 mounted on the area 81 has the playlist having the name of "pops" set thereto in an RFID tag 91A of the data tile 91. A data tile 92 mounted on the area 82 has the playlist having the name of "favorite" set thereto in an RFID tag 92A of the data tile 92.

When the user mounts the data tile 91 and the data tile 92 on the area 81 and the area 82, respectively, as shown in FIG. 14, a reader/writer 81A provided in the area 81 reads the playlist information stored in the RFID tag 91A. A reader/writer 82A provided in the area 82 reads the playlist information stored in the RFID tag 92A. The read information is supplied to the weight setting unit 62 via the selection receiving unit 64 in FIG. 6 to be used as playlists referred to at the time of random reproduction of musical pieces.

Incidentally, the area 83 in FIG. 14 also has a reader/writer 83A. When a data tile is mounted on the area 83, the reader/writer 83A reads data retained by the RFID tag.

In addition, an AND button 72, an OR button 73, and a Weight button 74 having the same functions as those shown in FIG. 12 or the like are provided outside the areas 81 to 83 (an edge part) of the input unit 34. Thus, the user mounts data tiles on the areas 81 to 83, and thereafter determines playlists by pressing one of the buttons.

Using the input unit 34 in FIG. 14, the user can select playlists by an intuitive operation of mounting data tiles.

Figure 15:
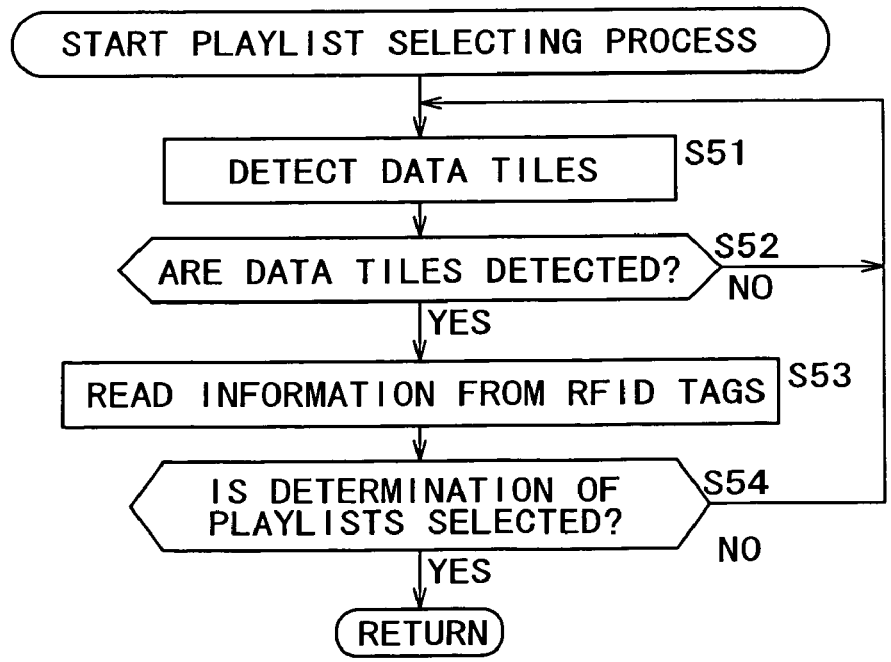
FIG. 15 is a flowchart of assistance in explaining a playlist selecting process.

A process of selecting playlists on the basis of input to the input unit 34 in FIG. 14 from the user will be described in the following with reference to a flowchart of FIG. 15. As with the process of FIG. 11, this selection process is performed in step S11 in FIG. 8, step S21 in FIG. 9, and step S31 in FIG. 10.

In step S51, the selection receiving unit 64 controls the reader/writers 81A to 83A to detect data tiles. The process proceeds to step S52, where the selection receiving unit 64 determines whether data tiles are detected. When the selection receiving unit 64 determines in step S52 that no data tiles are detected, the selection receiving unit 64 returns to step S51 to repeat detection of data tiles (repeatedly radiates electromagnetic waves to detect data tiles).

When the selection receiving unit 64 determines in step S52 that data tiles are detected, the process proceeds to step S53, where the selection receiving unit 64 controls the reader/writers 81A to 83A to read playlist information stored in RFID tags affixed to the data tiles. The playlist information read in step S53 is retained by the selection receiving unit 64.

The selection receiving unit 64 in step S54 determines whether determination of the playlists is selected, that is, whether one of the AND button 72, the OR button 73, and the Weight button 74 in FIG. 14 is pressed. When the selection receiving unit 64 determines that none of the AND button 72, the OR button 73, and the Weight button 74 is pressed, the selection receiving unit 64 returns to step S51 to repeat the process from step S51 on down. Thus, when the user mounts a plurality of data tiles on the areas 81 to 83, playlist information stored in RFID tags of the respective data tiles is read.

When the selection receiving unit 64 in step S54 determines that determination of the playlists is selected because one of the AND button 72, the OR button 73, and the Weight button 74 is pressed, the selection receiving unit 64 outputs the retained playlist information to the weight setting unit 62 to perform the subsequent process. Specifically, when the AND button 72 is pressed, the process from step S12 on down in FIG. 8 is performed. When the OR button 73 is pressed, the process from step S22 on down in FIG. 9 is performed. When the Weight button 74 is pressed, the process from step S32 on down in FIG. 10 is performed.

Thus, playlist selection may be made by various methods such for example as using the special tool to start random reproduction of musical pieces according to the set weights.

It is to be noted that the setting of weights is not limited to the setting methods described above. For example, according to an order in which playlists are selected by the user, a weight indicating a higher priority may be set to a playlist selected earlier and each musical piece registered in that playlist than a playlist selected later and each musical piece registered in that playlist. Alternatively, a weight may be set according to a number of times the user taps a playlist name on the list as shown in FIG. 12 or FIG. 13, for example.

In addition, weights may be updated sequentially according to an operation performed by the user during random reproduction of musical pieces so that musical pieces are selected on the basis of the updated weights. For example, when an instruction to skip a musical piece is given during reproduction of the musical piece, the musical piece is skipped and then reproduction of a next musical piece is started, and also the weight of the musical piece that was being reproduced is updated so as to be decreased. When during reproduction of a musical piece, the user inputs an instruction indicating that the user likes the musical piece, the weight of the musical piece being reproduced is updated so as to be increased.

FIG. 16 is a diagram showing an example of an external appearance of a reproduction apparatus 1 that can thus update the weight during reproduction of the musical piece.

The reproduction apparatus 1 of FIG. 16 is a portable type player. Provided below a display unit 101 for displaying a list of playlists and the like are a Yes button 111 operated when the user likes a musical piece being reproduced, a Skip button 112 operated to skip a musical piece because the user does not like the musical piece being reproduced, a stop button 113 operated to give an instruction to stop random reproduction, and a reproduction button 114 operated to give an instruction to start reproduction of a musical piece.

The reproduction apparatus 1 is provided with an earphone not shown in the figure or the like. The user can listen to musical pieces randomly reproduced by specifying playlists as described above. In addition, when the user likes a musical piece being reproduced, the user can increase the weight of the musical piece by pressing the Yes button 111, and thus increase a probability of the same musical piece thereafter being reproduced. When the user does not like a musical piece being reproduced, on the other hand, the user can decrease the weight of the musical piece by pressing the Skip button 112, and thus decrease a probability of the same musical piece thereafter being reproduced.

Incidentally, each button may be disposed on a remote controller connected to the reproduction apparatus 1 via a cable as shown in FIG. 17, instead of being disposed on a surface of the reproduction apparatus 1. In FIG. 17, a Yes button 111, a Skip button 112, a stop button 113, and a reproduction button 114 that are the same as those of FIG. 16 are disposed on a surface of the remote controller 121.

Figure 19:
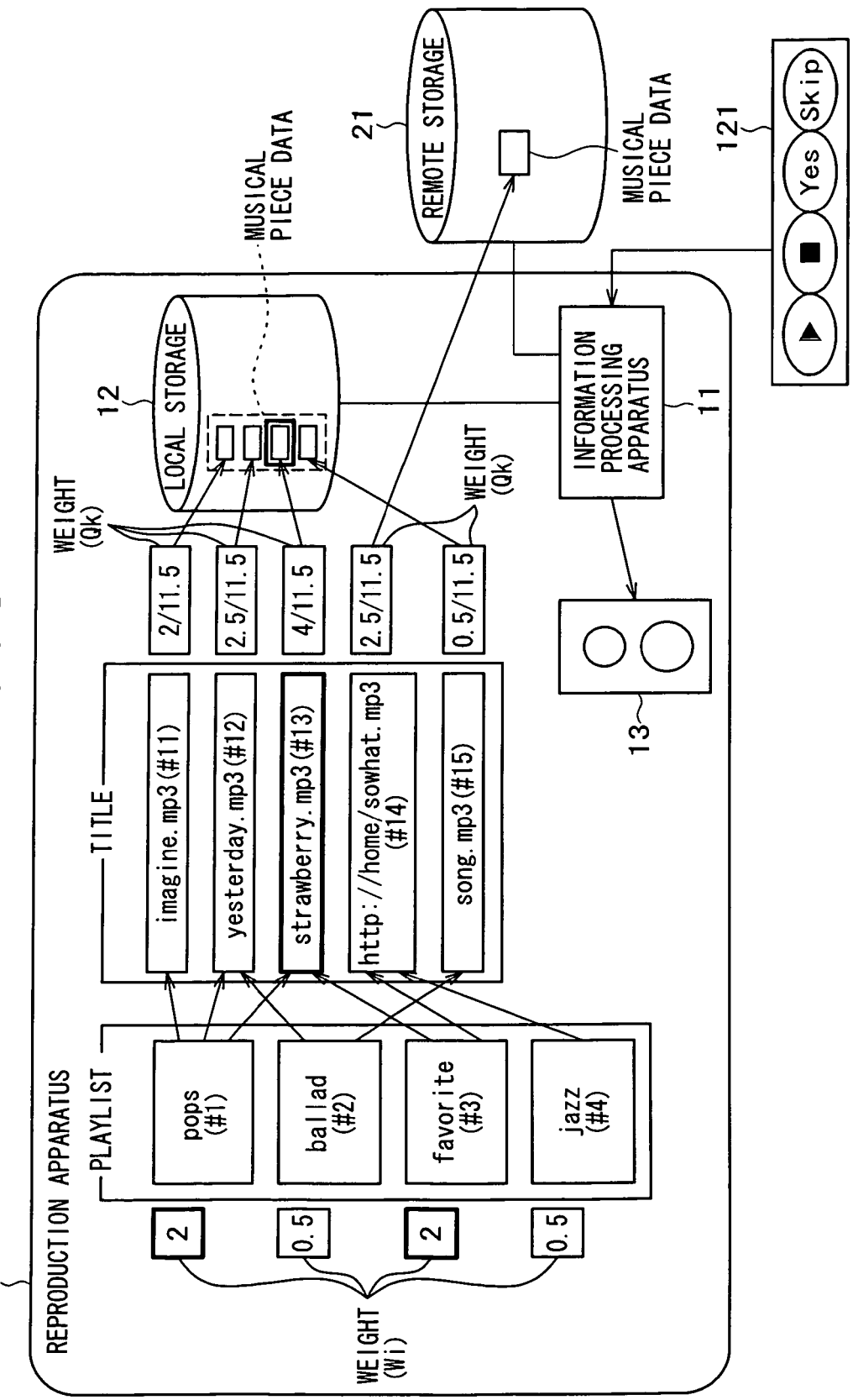
FIG. 19 is a diagram of another concept of updating of weights which updating is performed by the reproduction apparatus of FIG. 16.
Figure 20:
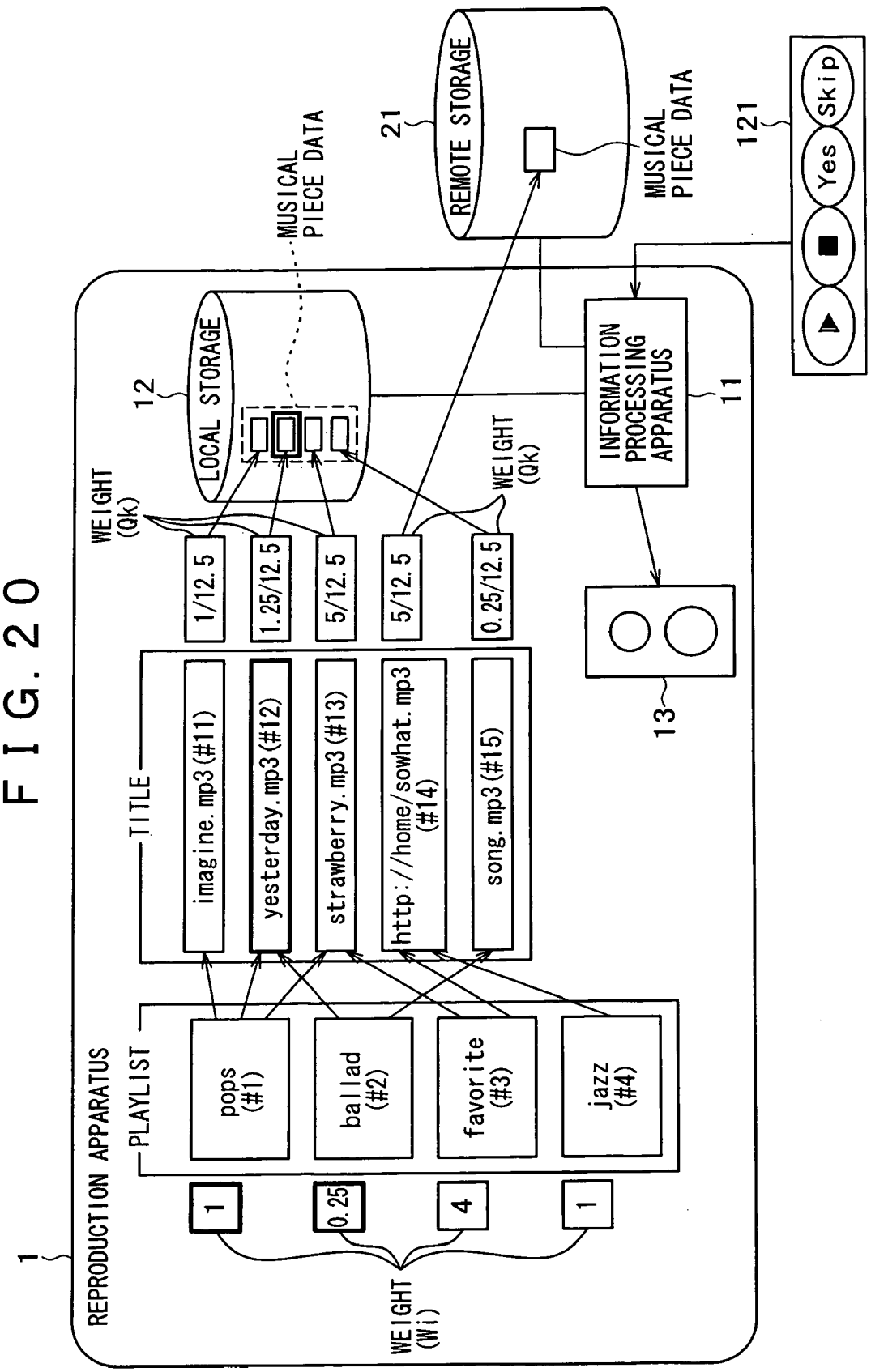
FIG. 20 is a diagram of a further concept of updating of weights which updating is performed by the reproduction apparatus of FIG. 16.

FIGS. 18 to 20 are diagrams of a concept of weight update performed by the reproduction apparatus 1 in response to pressing of the Yes button 111 or the Skip button 112.

The reproduction apparatus 1 in FIGS. 18 to 20 has the same configuration as the reproduction apparatus 1 shown in FIG. 1 except that FIGS. 18 to 20 show the remote controller 121 as an input device used by the user.

In FIG. 18, since an instruction to perform random reproduction with all of musical pieces reproducible by the reproduction apparatus 1, that is, all of musical pieces registered in playlists #1 to #4 as an object of the random reproduction is given, weights set to the playlists #1 to #4 are all "1." As in the case of FIG. 1, in this case, titles #11 to #13 are registered in the playlist #1; titles #12 and #15 are registered in the playlist #2; titles #13 and #14 are registered in the playlist #3; and the title #14 is registered in the playlist #4.

The weight of the title #11 is "1/8." The weight of the title #12 is "2/8." The weight of the title #13 is "2/8." The weight of the title #14 is "2/8." The weight of the title #15 is "1/8." The values of these weights are calculated from equations to be described later.

With such weights set, when for example playlists including the title #13 (the playlists #1 and #3) are selected and the Yes button 111 is pressed during reproduction of the title #13, the weights of the playlists #1 and #3 including the title #13 are each increased to "2", whereas the weights of the playlists #2 and #4 not including the title #13 are each decreased to "0.5", as shown in FIG. 19. At this time, in response to the updating of the playlists, the weight of each musical piece is also updated.

In an example of FIG. 19, the weight of the title #11 is updated to "2/11.5" The weight of the title #12 is updated to "2.5/11.5" The weight of the title #13 is updated to "4/11.5" The weight of the title #14 is updated to "2.5/11.5" The weight of the title #15 is updated to "0.5/11.5" Thereafter random reproduction is performed on the basis of the updated weights.

Incidentally, among pieces of musical piece data in the local storage 12 in FIG. 19, a third piece of data (block) from the top has a frame added thereto. This indicates that the title #13 is being reproduced. A frame in the local storage 12 in FIG. 20 also indicates musical piece data being reproduced.

In a state in which the weights shown in FIG. 19 are set, when for example playlists including the title #12 (the playlists #1 and #2) are then selected and the Skip button 112 is pressed during reproduction of the title #12, the weights of the playlists #1 and #2 including the title #12 are decreased to "1" and "0.25", respectively, whereas the weights of the playlists #3 and #4 not including the title #12 are each increased to "4" and "1", respectively, as shown in FIG. 20. At this time, in response to the updating of the playlists, the weight of each musical piece is also updated.

In an example of FIG. 20, the weight of the title #11 is updated to "1/12.5". The weight of the title #12 is updated to "1.25/12.5". The weight of the title #13 is updated to "5/12.5". The weight of the title #14 is updated to "5/12.5". The weight of the title #15 is updated to "0.25/12.5".

Calculation of the weights when the Yes button 111 or the Skip button 112 is pressed will be described in the following.

Let $P_1, P_2, P_3, \ldots, P_n$ be playlists and $T_1, T_2, T_3, \ldots, T_m$ be musical pieces registered in the playlists. Also, let $F_{i,j}$ be 1 when a playlist $P_i$ includes a musical piece $T_j$, and be 0 when the playlist $P_i$ does not include the musical piece $T_j$. Further letting $W_1, W_2, W_3, \ldots, W_n$ be weights of the playlists ($P_1, P_2, P_3, \ldots, P_n$), respectively, a reproduction probability $Q_k$ (weight $Q_k$) of a musical piece $T_k$ is determined by the following Equations (1) and (2).

[Equation 1]
$$Qk = \left( \sum_{i=1\ldots n} Fik * Wi \right) \Big/ Q \qquad (1)$$

[Equation 2]
$$Q = \sum_{i=1\ldots n, j=1\ldots m} Fij * Wi \qquad (2)$$

Making specific description, since the titles #11, #12, and #13 ($T_{\#11}, T_{\#12},$ and $T_{\#13}$) are registered in the playlist #1 ($P_{\#1}$) in FIG. 18, $F_{\#1, \#11} = 1$
$F_{\#1, \#12} = 1$
$F_{\#1, \#13} = 1$
$F_{\#1, \#14} = 0$
$F_{\#1, \#15} = 0$ Since the titles #12 and #15 ($T_{\#12}$ and $T_{\#15}$) are registered in the playlist #2 ($P_{\#2}$), $F_{\#2, \#11} = 0$
$F_{\#2, \#12} = 1$
$F_{\#2, \#13} = 0$
$F_{\#2, \#14} = 0$
$F_{\#2, \#15} = 1$ Since the titles #13 and #14 ($T_{\#13}$ and $T_{\#14}$) are registered in the playlist #3 ($P_{\#3}$), $F_{\#3, \#11} = 0$
$F_{\#3, \#12} = 0$
$F_{\#3, \#13} = 1$
$F_{\#3, \#14} = 1$
$F_{\#3, \#15} = 0$ Since the title #14 ($T_{\#14}$) is registered in the playlist #4 ($P_{\#4}$)

$F_{\#4, \#11} = 0$
$F_{\#4, \#12} = 0$
$F_{\#4, \#13} =$
$F_{\#4, \#14} = 1$
$F_{\#4, \#15} = 0$

Supposing that the weights $W_1$ to $W_4$ of the respective playlists are each 1 as shown in FIG. 18 and substituting the $F_{i,j}$ values, Q is determined from Equation (2).

$$Q = F_{\#1,\#11} \times W_1 + F_{\#1,\#12} \times W_1 + F_{\#1,\#13} \times W_1 + F_{\#1,\#14} \times$$

-continued
$$W_1 + F_{\#1,\#15} \times W_1 + F_{\#2,\#11} \times W_2 + F_{\#2,\#12} \times W_2 + F_{\#2,\#13} \times$$
$$W_2 + F_{\#2,\#14} \times W_2 + F_{\#2,\#15} \times W_2 + F_{\#3,\#11} \times W_3 + F_{\#3,\#12} \times$$
$$W_3 + F_{\#3,\#13} \times W_3 + F_{\#3,\#14} \times W_3 + F_{\#3,\#15} \times W_3 + F_{\#4,\#11} \times$$
$$W_4 + F_{\#4,\#12} \times W_4 + F_{\#4,\#13} \times W_4 + F_{\#4,\#14} \times W_4 + F_{\#4,\#15} \times$$
$$W_4$$
$$= 1 \times 1 + 1 \times 1 + 1 \times 1 + 0 \times 1 + 0 \times 1 + 0 \times 1 +$$
$$1 \times 1 + 0 \times 1 + 0 \times 1 + 1 \times 1 + 0 \times 1 + 0 \times 1 + 1 \times$$
$$1 + 1 \times 1 + 0 \times 1 + 0 \times 1 + 0 \times 1 + 0 \times 1 + 1 \times 1 + 0 \times 1$$
$$= 8$$

The weight $Q_{\#11}$ of the title #11 in FIG. 18 is determined from Equation (1) and Q=8.

$$Q_{\#11} = (F_{\#1,\#11} \times W_1 + F_{\#2,\#11} \times W_2 + F_{\#3,\#11} \times W_3 + F_{\#4,\#11} \times W_4)/Q$$
$$= (1 \times 1 + 0 \times 1 + 0 \times 1 + 0 \times 1)/8$$
$$= 1/8$$

The weight $Q_{\#12}$ of the title #12 in FIG. 18 is also determined from Equation (1) and Q=8.

$$Q_{\#12} = (F_{\#1,\#12} \times W_1 + F_{\#2,\#12} \times W_2 + F_{\#3,\#12} \times W_3 + F_{\#4,\#12} \times W_4)/Q$$
$$= (1 \times 1 + 1 \times 1 + 0 \times 1 + 0 \times 1)/8$$
$$= 2/8$$

Similarly, as shown in FIG. 18, "2/8" is obtained as the weight $Q_{\#13}$ of the title #13, "2/8" is obtained as the weight $Q_{\#14}$ of the title #14, and "1/8" is obtained as the weight $Q_{\#15}$ of the title #15.

When random reproduction of musical pieces is started on the basis of the thus calculated weights and then the Yes button 111 is pressed during reproduction of a musical piece $T_k$, for example, the weight $W_i$ of playlists in which the musical piece $T_k$ is registered (playlists in which $F_{i,k}=1$) is replaced with $W_i \times C$, and the weight $W_i$ of the other playlists in which the musical piece $T_k$ is not registered (playlists in which $F_{i,k}=0$) is replaced with $W_i/C$, where C is a constant assuming a value of C>1.

That is, the weight $W_i$ of the playlists in which the musical piece $T_k$ is registered is updated so as to be increased, while the weight $W_i$ of the playlists in which the musical piece $T_k$ is not registered is updated so as to be decreased.

Also, with the replacement of the weights $W_i$ of the playlists, recalculation based on Equations (1) and (2) is performed on the basis of the weights $W_i$ resulting from the replacement, whereby the weight of each title is also updated.

A musical piece registered in the same playlist as the musical piece $T_k$ that the user likes belongs to the same group represented by the playlist as the musical piece $T_k$. Therefore it is highly possible that the user also likes the musical piece registered in the same playlist as the musical piece $T_k$. Thus, the updating of the weights increases the reproduction probability of musical pieces that the user likes.

When the Skip button 112 is pressed during reproduction of the musical piece $T_k$, on the other hand, the weight $W_i$ of the playlists in which the musical piece $T_k$ is registered (playlists in which $F_{i,k}=1$) is replaced with $W_i/C$, and the weight $W_i$ of the other playlists in which the musical piece $T_k$ is not registered (playlists in which $F_{i,k}=0$) is replaced with $W_i \times C$.

That is, the weight $W_i$ of the playlists in which the musical piece $T_k$ is registered is updated so as to be decreased, while the weight $W_i$ of the playlists in which the musical piece $T_k$ is not registered is updated so as to be increased.

Also, with the replacement of the weights $W_i$ of the playlists, recalculation based on Equations (1) and (2) is performed on the basis of the weights $W_i$ resulting from the replacement, whereby the weight of each title is also updated.

A musical piece registered in the same playlist as the musical piece $T_k$ that the user does not like belongs to the same group represented by the playlist as the musical piece $T_k$. Therefore it is highly possible that the user does not like the musical piece registered in the same playlist as the musical piece $T_k$, either. Thus, the updating of the weights decreases the reproduction probability of musical pieces that the user does not like.

Hence, in a state in which the weights in FIG. 18 are set, when playlists including the title #13 (the playlists #1 and #3) are selected and the Yes button 111 is pressed during reproduction of the title #13, supposing that the value of C is "2", the weights W#1 and $W_{\#3}$ of the playlists #1 and #3 are each multiplied by 2 to become "2" as shown in FIG. 19.

The weights $W_{\#2}$ and $W_{\#4}$ of the playlists #2 and #4 not including the title #13 are each divided by 2 to become "0.5" as shown in FIG. 19.

In order to update also the weight of each title by Equations (1) and (2) on the basis of the playlist weight $W_i$, Q is determined as follows.

$$Q = F_{\#1,\#11} \times W_1 + F_{\#1,\#12} \times W_1 + F_{\#1,\#13} \times W_1 + F_{\#1,\#14} \times$$
$$W_1 + F_{\#1,\#15} \times W_1 + F_{\#2,\#11} \times W_2 + F_{\#2,\#12} \times W_2 + F_{\#2,\#13} \times$$
$$W_2 + F_{\#2,\#14} \times W_2 + F_{\#2,\#15} \times W_2 + F_{\#3,\#11} \times W_3 + F_{\#3,\#12} \times$$
$$W_3 + F_{\#3,\#13} \times W_3 + F_{\#3,\#14} \times W_3 + F_{\#3,\#15} \times W_3 + F_{\#4,\#11} \times$$
$$W_4 + F_{\#4,\#12} \times W_4 + F_{\#4,\#13} \times W_4 + F_{\#4,\#14} \times W_4 + F_{\#4,\#15} \times$$
$$W_4$$
$$= 1 \times 2 + 1 \times 2 + 1 \times 2 + 0 \times 2 + 0 \times 2 + 0 \times 0.5 + 1 \times 0.5 +$$
$$0 \times 0.5 + 0 \times 0.5 + 1 \times 0.5 + 0 \times 2 + 0 \times 2 + 1 \times 2 + 1 \times 2 +$$
$$0 \times 2 + 0 \times 0.5 + 0 \times 0.5 + 0 \times 0.5 + 1 \times 0.5 + 0 \times 0.5$$
$$= 11.5$$

The weight $Q_{\#11}$ of the title #11 is determined from Equation (1) and Q=11.5 (FIG. 19).

$$Q_{\#11} = (F_{\#1,\#11} \times W_1 + F_{\#2,\#11} \times W_2 + F_{\#3,\#11} \times W_3 + F_{\#4,\#11} \times W_4)/Q$$
$$= (1 \times 2 + 0 \times 0.5 + 0 \times 2 + 0 \times 0.5)/11.5$$
$$= 2/11.5$$

The weight $Q_{\#12}$ of the title #12 is determined from Equation (1) and Q=11.5 (FIG. 19).

$$Q_{\#12} = (F_{\#1,\#12} \times W_1 + F_{\#2,\#12} \times W_2 + F_{\#3,\#12} \times W_3 + F_{\#4,\#12} \times W_4)/Q$$
$$= (1 \times 2 + 1 \times 0.5 + 0 \times 2 + 0 \times 0.5)/11.5$$
$$= 2.5/11.5$$

The weight $Q_{\#13}$ of the title #13 is determined from Equation (1) and Q=11.5 (FIG. 19).

$$Q_{\#13} = (F_{\#1,\#13} \times W_1 + F_{\#2,\#13} \times W_2 + F_{\#3,\#13} \times W_3 + F_{\#4,\#13} \times W_4)/Q$$
$$= (1 \times 2 + 0 \times 0.5 + 1 \times 2 + 0 \times 0.5)/11.5$$
$$= 4/11.5$$

The weight $Q_{\#14}$ of the title #14 is determined from Equation (1) and Q=11.5 (FIG. 19).

$$Q_{\#14} = (F_{\#1,\#14} \times W_1 + F_{\#2,\#14} \times W_2 + F_{\#3,\#14} \times W_3 + F_{\#4,\#14} \times W_4)/Q$$
$$= (0 \times 2 + 0 \times 0.5 + 1 \times 2 + 1 \times 0.5)/11.5$$
$$= 2.5/11.5$$

The weight $Q_{\#15}$ of the title #15 is determined from Equation (1) and Q=11.5 (FIG. 19).

$$Q_{\#15} = (F_{\#1,\#15} \times W_1 + F_{\#2,\#15} \times W_2 + F_{\#3,\#15} \times W_3 + F_{\#4,\#15} \times W_4)/Q$$
$$= (0 \times 2 + 1 \times 0.5 + 0 \times 2 + 0 \times 0.5)/11.5$$
$$= 0.5/11.5$$

A comparison between the weights of each title before and after the pressing of the Yes button 111 during reproduction of the title #13 (FIG. 18 and FIG. 19) shows that the weight of the title #11 is increased from "1/8 (0.125)" to "2/11.5 (1.739 . . . )" and that the weight of the title #13 is increased from "2/8 (0.250)" to "4/11.5 (0.347 . . . )."

The weight of the title #15 is decreased from "1/8 (0.125)" to "0.5/11.5 (0.043 . . . )."

As for the title #12, since the title #12 is registered in the playlist #1 including the title #13 that the user likes but also registered in the playlist #2 not including the title #13, the weight of the title #12 is slightly decreased from "2/8 (0.250)" to "2.5/11.5 (0.217 . . . )." Similarly, as for the title #14, since the title #14 is registered in the playlist #3 including the title #13 that the user likes but also registered in the playlist #4 not including the title #13, the weight of the title #14 is slightly decreased from "2/8 (0.250)" to "2.5/11.5 (0.217 . . . )."

As described above, the weight of the title #13 of the musical piece $T_k$ that the user likes is increased, of course. Also, the weights of titles registered in the same playlist as the title #13 are updated so as to be increased, and the weights of titles not registered in the same playlist as the title #13 are updated so as to be decreased.

In a state in which the weights in FIG. 19 are set, when playlists including the title #12 (the playlists #1 and #2) are selected and the Skip button 112 is pressed during reproduction of the title #12, supposing that the value of C is "2", the weights $W_{\#1}$ and $W_{\#2}$ of the playlists #1 and #2 are each divided by 2 to become "1" and "0.25" as shown in FIG. 20.

The weights $W_{\#3}$ and $W_{\#4}$ of the playlists #3 and #4 not including the title #12 are each multiplied by 2 to become "4" and "1" as shown in FIG. 20.

In order to update also the weight of each title by Equations (1) and (2) on the basis of the playlist weight $W_j$, Q is determined as follows.

$$Q = F_{\#1,\#11} \times W_1 + F_{\#1,\#12} \times W_1 + F_{\#1,\#13} \times W_1 + F_{\#1,\#14} \times W_1 + F_{\#1,\#15} \times W_1 + F_{\#2,\#11} \times W_2 + F_{\#2,\#12} \times W_2 + F_{\#2,\#13} \times W_2 + F_{\#2,\#14} \times W_2 + F_{\#2,\#15} \times W_2 + F_{\#3,\#11} \times W_3 + F_{\#3,\#12} \times W_3 + F_{\#3,\#13} \times W_3 + F_{\#3,\#14} \times W_3 + F_{\#3,\#15} \times W_3 + F_{\#4,\#11} \times W_4 + F_{\#4,\#12} \times W_4 + F_{\#4,\#13} \times W_4 + F_{\#4,\#14} \times W_4 + F_{\#4,\#15} \times W_4$$
$$= 1 \times 1 + 1 \times 1 + 1 \times 1 + 0 \times 1 + 0 \times 1 + 0 \times 0.25 + 1 \times 0.25 + 0 \times 0.25 + 0 \times 0.25 + 1 \times 0.25 + 0 \times 4 + 0 \times 4 + 1 \times 4 + 1 \times 4 + 0 \times 4 + 0 \times 1 + 0 \times 1 + 0 \times 1 + 1 \times 1 + 0 \times 1$$
$$= 12.5$$

The weight $Q_{\#11}$ of the title #11 is determined from Equation (1) and Q=12.5 (FIG. 20).

$$Q_{\#11} = (F_{\#1,\#11} \times W_1 + F_{\#2,\#11} \times W_2 + F_{\#3,\#11} \times W_3 + F_{\#4,\#11} \times W_4)/Q$$
$$= (1 \times 1 + 0 \times 0.25 + 0 \times 4 + 0 \times 1)/12.5$$
$$= 1/12.5$$

The weight $Q_{\#12}$ of the title #12 is determined from Equation (1) and Q=12.5 (FIG. 20).

$$Q_{\#12} = (F_{\#1,\#12} \times W_1 + F_{\#2,\#12} \times W_2 + F_{\#3,\#12} \times W_3 + F_{\#4,\#12} \times W_4)/Q$$
$$= (1 \times 1 + 1 \times 0.25 + 0 \times 4 + 0 \times 1)/12.5$$
$$= 1.25/12.5$$

The weight $Q_{\#13}$ of the title #13 is determined from Equation (1) and Q=12.5 (FIG. 20).

$$Q_{\#13} = (F_{\#1,\#13} \times W_1 + F_{\#2,\#13} \times W_2 + F_{\#3,\#13} \times W_3 + F_{\#4,\#13} \times W_4)/Q$$
$$= (1 \times 1 + 0 \times 0.25 + 1 \times 4 + 0 \times 1)/12.5$$
$$= 5/12.5$$

The weight $Q_{\#14}$ of the title #14 is determined from Equation (1) and Q=12.5 (FIG. 20).

$$Q_{\#14} = (F_{\#1,\#14} \times W_1 + F_{\#2,\#14} \times W_2 + F_{\#3,\#14} \times W_3 + F_{\#4,\#14} \times W_4)/Q$$
$$= (0 \times 1 + 0 \times 0.25 + 1 \times 4 + 1 \times 1)/12.5$$
$$= 5/12.5$$

The weight $Q_{\#15}$ of the title #15 is determined from Equation (1) and Q=12.5 (FIG. 20).

$$Q_{\#15} = (F_{\#1,\#15} \times W_1 + F_{\#2,\#15} \times W_2 + F_{\#3,\#15} \times W_3 + F_{\#4,\#15} \times W_4)/Q$$
$$= (0 \times 1 + 1 \times 0.25 + 0 \times 4 + 0 \times 1)/12.5$$
$$= 0.25/12.5$$

A comparison between the weights of each title before and after the pressing of the Skip button 112 during reproduction of the title #12 (FIG. 19 and FIG. 20) shows that the weight of the title #11 is decreased from "2/11.5 (1.739 . . . )" to "1/12.5 (0.080)", that the weight of the title #12 is decreased from "2.5/11.5 (0.217 . . . )" to "1.25/12.5 (0.100)", and that the weight of the title #15 is decreased from "0.5/11.5 (0.043 . . . )" to "0.25/12.5 (0.020)."

The weight of the title #13 is increased from "4/11.5 (0.347 . . . )" to "5/12.5 (0.400)." The weight of the title #14 is increased from "2.5/11.5 (0.217 . . . )" to "5/12.5 (0.400)."

As described above, the weight of the title #12 of the musical piece $T_k$ that the user does not like is decreased, of course. Also, the weights of titles registered in the same playlist as the title #12 are updated so as to be decreased, and the weights of titles not registered in the same playlist as the title #12 are updated so as to be increased.

Figure 21:
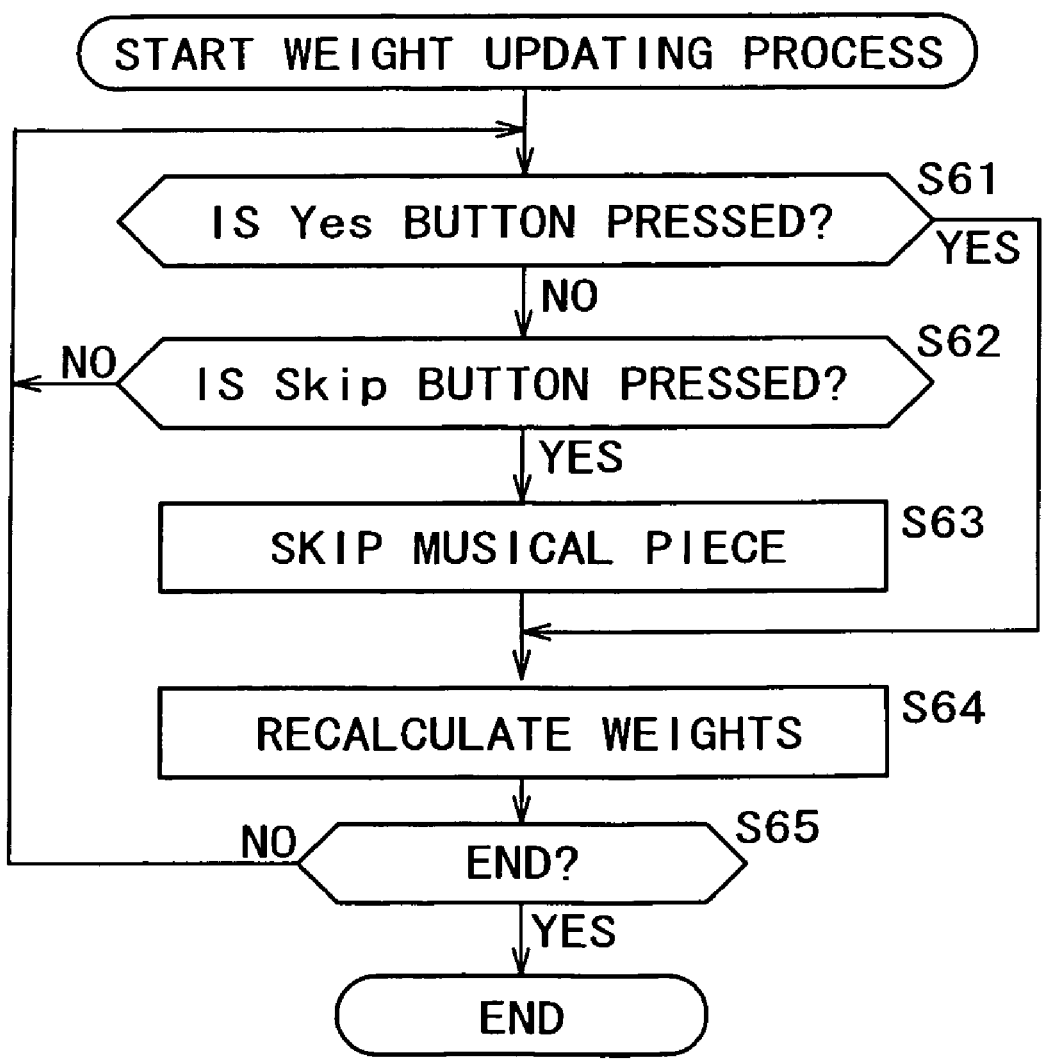
FIG. 21 is a flowchart of assistance in explaining a weight updating process of the controller.

A process of the controller 31 for updating weights in response to the pressing of the Yes button 111 or the Skip button 112 will next be described with reference to a flowchart of FIG. 21.

Incidentally, suppose that random reproduction is already performed with musical pieces registered in selected playlists, or all of musical pieces reproducible by the reproduction apparatus 1 as an object of the random reproduction.

In step S61, the weight setting unit 62 determines on the basis of a signal input via the selection receiving unit 64 whether or not the Yes button 111 is pressed because the user likes a musical piece being reproduced. When the weight setting unit 62 determines that the Yes button 111 is not pressed, the process proceeds to step S62.

In step S62, the weight setting unit 62 determines whether or not the Skip button 112 is pressed. When the weight setting unit 62 determines that the Skip button 112 is not pressed, the process returns to step S61 to repeat determination of whether or not the button is pressed.

When the weight setting unit 62 determines in step S62 that the Skip button 112 is pressed, on the other hand, the process proceeds to step S63, where the weight setting unit 62 instructs the reproduction control unit 63 to skip the musical piece so as to skip the musical piece and select a next musical piece.

After the musical piece is skipped and when the weight setting unit 62 determines in step S61 that the Yes button 111 is pressed, the weight setting unit 62 proceeds to step S64 to recalculate weights. In this case, as described above, the weights of musical pieces registered in the same playlist as the musical piece that the user likes, which is expressed by an input (the musical piece being reproduced when the Yes button 111 is pressed), are updated so as to be increased. The weights of musical pieces registered in the same playlist as the musical piece that the user does not like, which is expressed by an input (the musical piece being reproduced when the Skip button 112 is pressed), are updated so as to be decreased.

The weight setting unit 62 in step S65 determines whether or not an instruction to end the random reproduction is given. The process returns to step S61 to repeat the process from step S61 on down until the weight setting unit 62 determines that an instruction to end the random reproduction is given. When the weight setting unit 62 determines in step S65 that an instruction to end the random reproduction is given, the process is ended.

As described above, the weight of each title can be updated in response to an input from the user.

It is to be noted that in the above description, in response to the pressing of the Yes button 111, the weights of playlists in which a musical piece being reproduced at the time of the pressing of the Yes button 111 is registered are updated so as to be increased (multiplied by C) and the weights of playlists in which the musical piece being reproduced at the time of the pressing of the Yes button 111 is not registered are updated so as to be decreased (divided by C), whereas in response to the pressing of the Skip button 112, the weights of playlists in which a musical piece being reproduced at the time of the pressing of the Skip button 112 is registered are updated so as to be decreased and the weights of playlists in which the musical piece being reproduced at the time of the pressing of the Skip button 112 is not registered are updated so as to be increased; however, in response to the pressing of the Yes button 111, only the weights of playlists in which a musical piece being reproduced at the time of the pressing of the Yes button 111 is registered may be updated so as to be increased (multiplied by C), whereas in response to the pressing of the Skip button 112, only the weights of playlists in which a musical piece being reproduced at the time of the pressing of the Skip button 112 is registered may be updated so as to be decreased (divided by C).

Also by thus updating the weights, the weights of musical pieces registered in the same playlist as the musical piece that the user likes are updated so as to be increased, and the weights of musical pieces registered in the same playlist as the musical piece that the user does not like are updated so as to be decreased.

In addition, for example, several seconds may be provided as a period for detecting the pressing of the Yes button 111 and the Skip button 112, so that the weights of musical pieces are updated according to a number of times the Yes button 111 or the Skip button 112 is pressed consecutively during the period.

For example, when the Yes button 111 is pressed a plurality of consecutive times within the detecting period, the user can set the weight of a musical piece being reproduced at this time to be increased more than when the Yes button 111 is pressed only once, whereas when the Skip button 112 is pressed a plurality of consecutive times within the detecting period, the user can set the weight of a musical piece being reproduced at this time to be decreased more than when the Skip button 112 is pressed only once.

Figure 22:
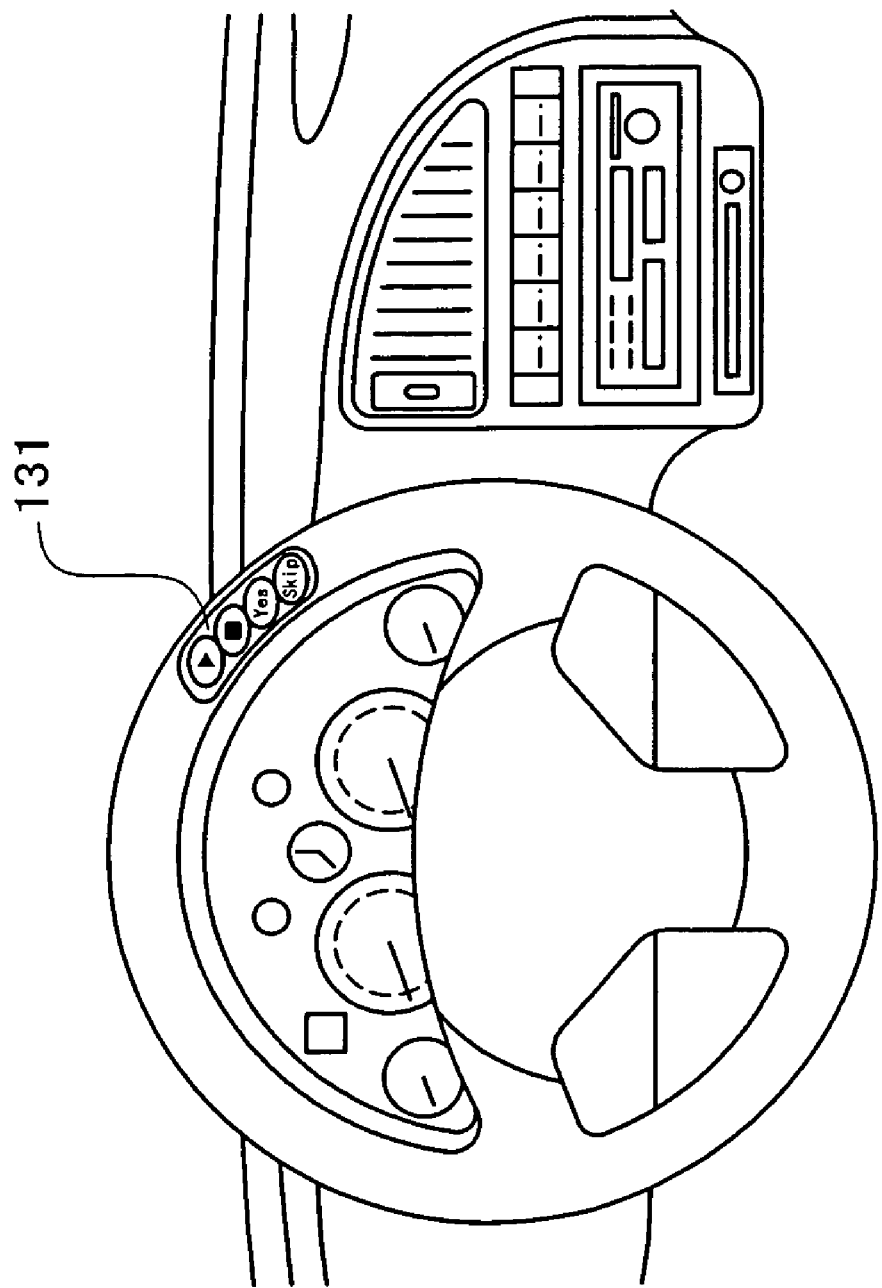
FIG. 22 is a diagram showing an example of an input unit.

Placing positions of the Yes button 111 and the Skip button 112 operated to update such weights are not limited to the surface of the reproduction apparatus 1 as shown in FIG. 16 or the surface of the remote controller 121 as shown in FIG. 17. For example, as shown in FIG. 22, an input unit 131 provided with buttons similar to the Yes button 111 and the Skip button 112 is disposed on a steering wheel of a car, whereby a driver can easily select musical pieces that the driver likes or does not like, the musical pieces being randomly reproduced by an audio apparatus (the reproduction apparatus 1) in the car, without affecting driving.

It is to be noted that while in the above description, the weights are updated in response to an operation of the Yes button 111 or the Skip button 112 by the user, the weights may be updated according to various conditions such for example as time and a position detected by GPS (Global Positioning System) when the reproduction apparatus 1 has a GPS function.

Also, while in the above description, musical pieces are randomly reproduced on the basis of weights, contents reproduced randomly may be not only musical pieces but also still pictures taken by a digital camera and moving pictures recorded by a hard disk recorder.

For example, when random reproduction of still pictures (random slide show display) is performed, a user can increase a probability of display of a still picture that the user likes by pressing a Yes button. As for a still picture that the user does not like, by pressing a Skip button, the user can display a next still picture immediately after pressing the Skip button and also decrease a probability of display of the still picture that the user does not like.

The weights set as described above may be reset each time the reproduction apparatus 1 is used (each time power is turned on) or may be retained even in a power-off state. Also, the weights can be stored on a storage medium detachable from the reproduction apparatus 1, such as a memory card or the like, and the user may insert the storage medium into the reproduction apparatus 1 when using the reproduction apparatus 1 to make musical pieces reproduced randomly with the weights set in past use by the user.

Further, while in the above description, musical pieces are selected on the basis of weights, an additional condition, for example a condition that reproduction of the same musical piece should not be repeated for a certain period of time may be set on the basis of a history of past reproductions.

In the above description, a file name or a title set to each musical piece is used to identify each musical piece at the time of creation of a playlist, updating of weights, or the like. However, an ID of each musical piece generated by a predetermined algorithm may be used.

In this case, playlists are formed by a list of generated IDs rather than a list of titles as shown in FIG. 2. On the basis of the IDs registered in the playlists, whether one musical piece is registered duplicately in a plurality of playlists is determined or musical pieces to be reproduced are selected as described above, for example.

An ID includes for example a number of a predetermined number of digits and an alphabet, and is generated on the basis of characteristics of a waveform of a musical piece in predetermined timing in which data of the musical piece is captured by the reproduction apparatus 1 (the local storage 12 in FIG. 1), for example. Incidentally, another apparatus identifying the musical piece by using the ID in the same manner as the reproduction apparatus 1 generates the ID by the same algorithm as the reproduction apparatus 1. Thus, the same musical piece is identified by the same ID even between the different apparatuses.

Figure 23:
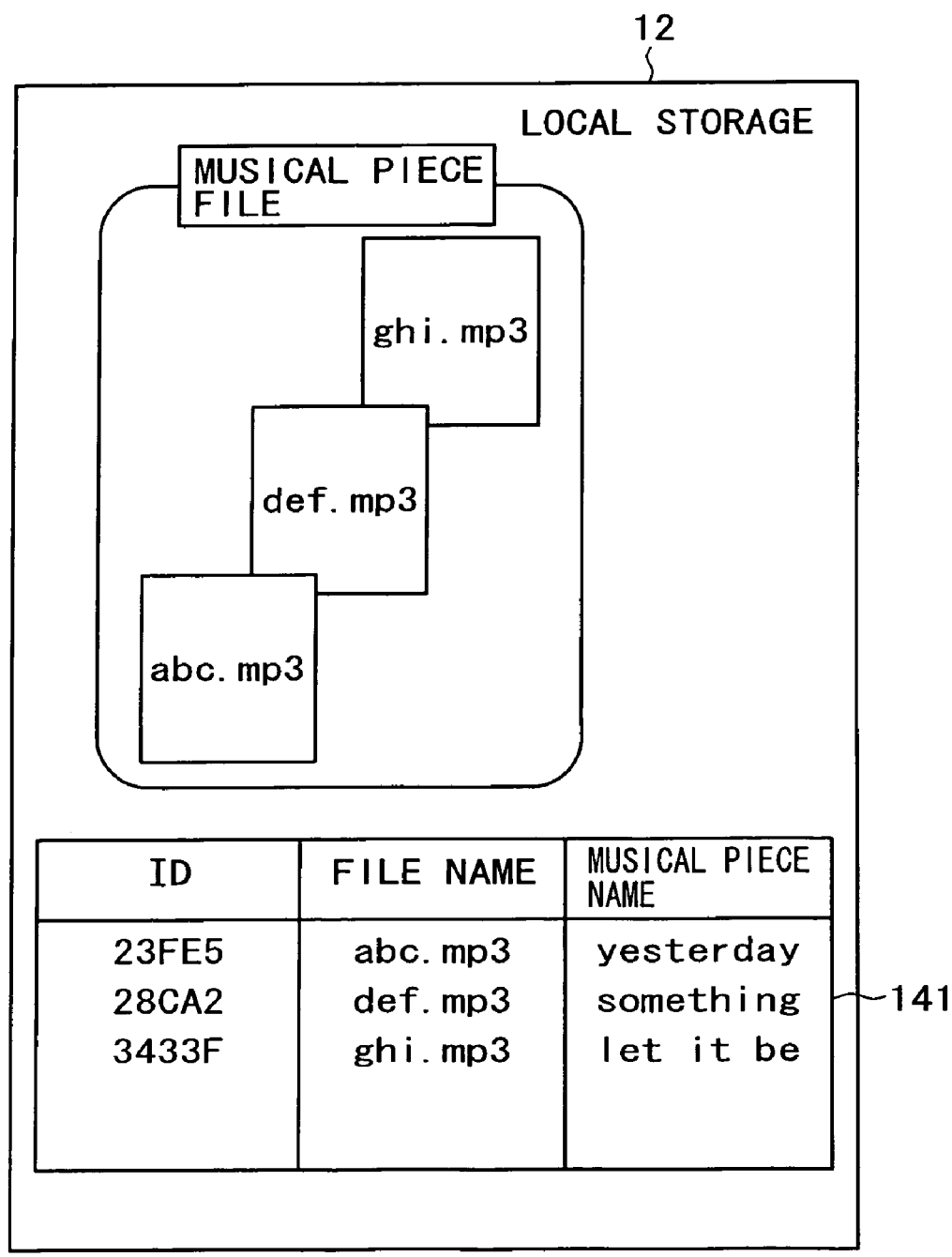
FIG. 23 is a diagram showing an example of information stored in a local storage.

FIG. 23 is a diagram showing an example of information stored in the local storage 12 of the reproduction apparatus 1.

As shown in FIG. 23, the local storage 12 stores musical piece files (musical piece data) and a correspondence table 141 in which IDs generated from waveforms of respective musical pieces, file names, and musical piece names (titles) are managed in association with each other, for example.

For example, in the example of FIG. 23, a musical piece identified by a file name of "abc.mp3" and a musical piece name of "yesterday" is identified by an ID "23FE5" generated from a waveform of the musical piece. A musical piece identified by a file name of "def.mp3" and a musical piece name of "something" is identified by an ID "28CA2" generated from a waveform of the musical piece. A musical piece identified by a file name of "ghi.mp3" and a musical piece name of "let it be" is identified by an ID "3433F" generated from a waveform of the musical piece.

The correspondence table 141 is used at the time of creation of a playlist as described above and the like.

For example, when the user specifies a title of a musical piece as a musical piece to be registered in a playlist, the controller 31 (FIG. 5) of the information processing apparatus 11 refers to the correspondence table 141 and registers an ID generated from the musical piece with the title specified by the user to thereby create a playlist.

When one playlist is selected and an instruction to reproduce musical pieces is given, the controller 31 refers to the correspondence table 141 and thereby obtains file names of the musical pieces to be reproduced from IDs registered in the playlist, and then reproduces the musical pieces.

Information described in the correspondence table 141 is also used when a playlist is provided to another apparatus, for example. As described above, the same musical piece is managed by the same ID even between the different apparatuses. Hence, for example, when a similar correspondence table is provided in the apparatus to which to supply the playlist, the playlist can be supplied by only transmitting IDs.

When a plurality of users thus supply playlists to each other, one playlist suited to preferences of the plurality of users may be extracted from the playlists managed by the respective apparatuses.

In this case, one playlist including IDs of musical pieces registered duplicately in two playlists, that is, a first playlist managed by a first apparatus and a second playlist managed by a second apparatus, for example, is extracted from the playlists as one playlist suited to preferences of a plurality of users. It is thereby possible to easily create a playlist including common musical pieces that friends like, for example.

By thus using playlists created by a plurality of respective apparatuses, a common musical piece possessed by users of the plurality of apparatuses can be reproduced automatically by the apparatuses when the users are communicating with each other through a chat, a voice chat, a multiplayer game, or an IP telephone, for example. This is carried out by transmitting a command to reproduce a specific musical piece from one apparatus to another apparatus, for example.

This system does not transfer musical pieces via a network, for example, and can therefore make the same musical piece reproduced in a plurality of apparatus while avoiding the problem of copyright infringement. Also, problems such as transmission delay, reproduction faults and the like due to band limitation of the network can also be solved.

Further, since a common musical piece shared between a plurality of apparatus is reproduced, the users can communicate with each other with the musical piece as a common topic.

Incidentally, when playlists from respective apparatus can be uploaded to one server, an administrator of the server can provide service of selling a user of an apparatus accessing the server only a musical piece that is suited to preferences of the user and is not possessed by the user by analyzing musical pieces registered in the plurality of uploaded playlists.

The series of processes described above can be carried out not only by hardware but also by software.

When the series of processes is to be carried out by software, a program constituting the software is installed from a network or a recording medium onto a computer incorporated in special hardware, or a general-purpose personal computer, for example, that can perform various functions by installing various programs thereon.

The recording medium is not only formed by a packaged medium having the program recorded thereon and distributed to users to provide the program separately from the reproduction apparatus 1 proper, the packaged medium including a magnetic disk (including flexible disks), an optical disk (including CD-ROM (Compact Disk-Read Only Memory) and DVD (Digital Versatile Disk)), a magneto-optical disk (including MD (MiniDisk) (registered trademark)), a semiconductor memory or the like, but also formed by a ROM (Read Only Memory), a hard disk including the local storage 12, or the like having the program recorded therein and provided to the user in a state of being preincorporated in the apparatus proper.

It is to be noted that in the present specification, the steps describing the program recorded on the recording medium include not only processes carried out in time series in the described order but also processes carried out in parallel or individually and not necessarily in time series.

What is claimed is:

1. An information processing apparatus for controlling content reproduction, comprising:
a processor;
a weight creating unit configured to create a first weight set to a playlist of said contents indicating a priority of the playlist and a second weight set to each of contents registered in playlists indicating a priority of the content, the second weight is a number of times the content is present in a plurality of playlists;
a weight setting unit configured to, when a plurality of playlists are selected, update said first weight set to each of the plurality of selected said playlists and update said second weight set to said each of said contents registered in the plurality of selected said playlists according to a number of playlists in which each of the contents is registered and a reproduction method; and
a reproduction controlling unit configured to control random content reproduction based on said first weight and said second weight set by said weight setting unit,
wherein, when an instruction to perform said reproduction method of the plurality of selected said playlists which contain duplicate contents is given, said weight setting unit updates said second weights set to the duplicate contents registered in the plurality of selected said playlists.

2. The information processing apparatus as claimed in claim 1,
wherein when an instruction to perform, as said reproduction method, random reproduction using more than one set of said contents registered in the plurality of selected said playlists is given, said weight setting unit updates said second weights set to all the contents registered in the plurality of selected said playlists.

3. The information processing apparatus as claimed in claim 1,
wherein when an instruction to update a weight of a content being reproduced is given by control of said reproduction controlling unit, said weight setting unit updates said first weights set to said playlists in which said content being reproduced is registered to effect one of an increase and a decrease in said first weights according to the instruction, and also updates weights of other contents registered in the playlists in which said content being reproduced is registered on a basis of the updated said first weights.

4. The information processing apparatus as claimed in claim 1, wherein the first weights of selected playlists are set to a number one and the first weights of unselected playlists are set to a number zero.

5. The information processing apparatus as claimed in claim 1, wherein the second weights of duplicate contents in the plurality of playlists are set to a number one and non-duplicate contents in the plurality of playlists are set to a number zero.

6. The information processing apparatus as claimed in claim 1, wherein contents that have a higher second weight number have a higher priority of reproduction than contents with a lower second weight number.

7. An information processing method of an information processing apparatus for controlling content reproduction on a basis of a first weight set to a playlist of contents indicating a priority of the playlist and a second weight set to each of said contents registered in playlists indicating a priority of the content, said information processing method, comprising:
creating said first weight set and said second weight set, the second weight is a number of times the content is present in a plurality of playlists;
updating said first weight set to each of the plurality of selected said playlists when a plurality of playlists are selected, and updating said second weight set to each of said contents registered in the plurality of selected said playlists according to a number of playlists in which each of the contents is registered and a specified reproduction method; and
controlling random content reproduction based on said first weight and said second weight set by a process of said weight setting step,
wherein, when an instruction to perform said reproduction method of the plurality of selected said playlists containing duplicate contents is given, said weight setting unit updates said second weights set to the duplicate contents registered in the plurality of selected said playlists.

8. A computer readable storage medium encoded with instructions configured to be executed by a computer and cause a processor to perform a method for controlling content reproduction on a basis of a first weight set to a playlist of contents indicating a priority of the playlist and a second weight set to each of contents registered in playlists indicating a priority of the content, said method comprising:
creating said first weight set and said second weight set, the second weight is a number of times the content is present in a plurality of playlists;
updating said first weight set to each of the plurality of selected said playlists when a plurality of playlists are selected, and updating said second weight set to said each of said contents registered in the plurality of selected said playlists according to a number of playlists in which each of the contents is registered and a specified reproduction method; and
controlling random content reproduction based on said first weight and said second weight set by a process of said weight setting step,
wherein, when an instruction to perform said reproduction method of the plurality of selected said playlists containing duplicate contents is given, said weight setting unit updates said second weights set to the duplicate contents registered in the plurality of selected said playlists.

9. An information processing means for controlling content reproduction on a basis of a first weight set to a playlist of contents indicating a priority of the playlist and a second weight set to each of said contents registered in playlists indicating a priority of the content, said information processing means comprising:
a processor;
a weight creating means for creating said first weight set and said second weight set, the second weight is a number of times the content is present in a plurality of playlists;
a weight setting means for, when a plurality of playlists are selected, updating said first weight set to each of the plurality of selected said playlists and updating said second weight set to said each of said contents registered in the plurality of selected said playlists according to a number of playlists in which each of the contents is registered and a specified reproduction method; and a reproduction controlling means for controlling random content reproduction based on said first weight and said second weight set by said weight setting means, wherein, when an instruction to perform said reproduction method of the plurality of selected said playlists containing duplicate contents is given, said weight setting unit updates said second weights set to the duplicate contents registered in the plurality of selected said playlists.

* * * * *